(12) United States Patent
Kim et al.

(10) Patent No.: US 10,896,661 B2
(45) Date of Patent: Jan. 19, 2021

(54) IMAGE PROCESSING APPARATUS AND METHOD FOR CONTROLLING THE SAME

(71) Applicant: Samsung Electronics Co., Ltd., Suwon-si (KR)

(72) Inventors: Seung-hoon Kim, Seoul (KR); Kwang-sun Baek, Seoul (KR); Jung-won Lee, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/026,903

(22) Filed: Jul. 3, 2018

(65) Prior Publication Data

US 2019/0012990 A1    Jan. 10, 2019

(30) Foreign Application Priority Data

Jul. 5, 2017    (KR) ........................ 10-2017-0085560

(51) Int. Cl.
| | | |
|---|---|---|
| *G09G 5/397* | (2006.01) | |
| *G06T 1/20* | (2006.01) | |
| *G09G 5/393* | (2006.01) | |
| *G09G 5/00* | (2006.01) | |
| *G09G 5/36* | (2006.01) | |

(52) U.S. Cl.
CPC .............. *G09G 5/397* (2013.01); *G06T 1/20* (2013.01); *G09G 5/006* (2013.01); *G09G 5/363* (2013.01); *G09G 5/393* (2013.01); *G09G 2340/10* (2013.01); *G09G 2360/18* (2013.01)

(58) Field of Classification Search
None
See application file for complete search history.

(56) References Cited

U.S. PATENT DOCUMENTS

| | | | | |
|---|---|---|---|---|
| 4,528,636 A | * | 7/1985 | Robinson, III | ........ G09G 5/393 345/592 |
| 5,959,637 A | | 9/1999 | Mills et al. | |
| 6,084,600 A | | 7/2000 | Munshi | |
| | | (Continued) | | |

FOREIGN PATENT DOCUMENTS

| | | |
|---|---|---|
| CN | 102215428 A | 10/2011 |
| JP | 2015-099443 | 5/2015 |
| | (Continued) | |

OTHER PUBLICATIONS

Intellectual Property Office of Singapore Written Opinion dated Nov. 26, 2018 for Application No. 10201805814U.

(Continued)

*Primary Examiner* — Nurun N Flora
(74) *Attorney, Agent, or Firm* — Harness, Dickey and Pierce, P.L.C.

(57) ABSTRACT

An image processing apparatus and a method of controlling the image processing apparatus are provided. The image processing apparatus includes a memory unit; and a processor configured to store image data of all pixels of a zone set in a first image frame in an area of the memory unit, which corresponds to the zone, when at least one of the pixels of the zone does not satisfy a predefined condition, and not to store image data of each of the pixels of the zone in the area of the memory unit, which corresponds to the zone, when all the pixels of the zone satisfy the predefined condition.

18 Claims, 19 Drawing Sheets

(56) References Cited

U.S. PATENT DOCUMENTS

| | | |
|---|---|---|
| 6,870,538 B2 | 3/2005 | MacInnis et al. |
| 7,362,327 B2 | 4/2008 | Katsuyama |
| 7,720,312 B2 | 5/2010 | Maier et al. |
| 2006/0228023 A1* | 10/2006 | Yi .................... G09G 5/397 382/167 |
| 2016/0110837 A1 | 4/2016 | Sideris et al. |
| 2016/0112669 A1 | 4/2016 | Lee et al. |
| 2017/0004808 A1* | 1/2017 | Agashe ............ G09G 5/363 |

FOREIGN PATENT DOCUMENTS

| | | |
|---|---|---|
| KR | 10-0706442 | 9/2006 |
| KR | 10-1169994 | 10/2006 |
| WO | WO-2017-107183 A1 | 6/2017 |

OTHER PUBLICATIONS

Intellectual Property Office of Singapore Search Report dated Nov. 23, 2018 for Application No. 10201805814U.

\* cited by examiner

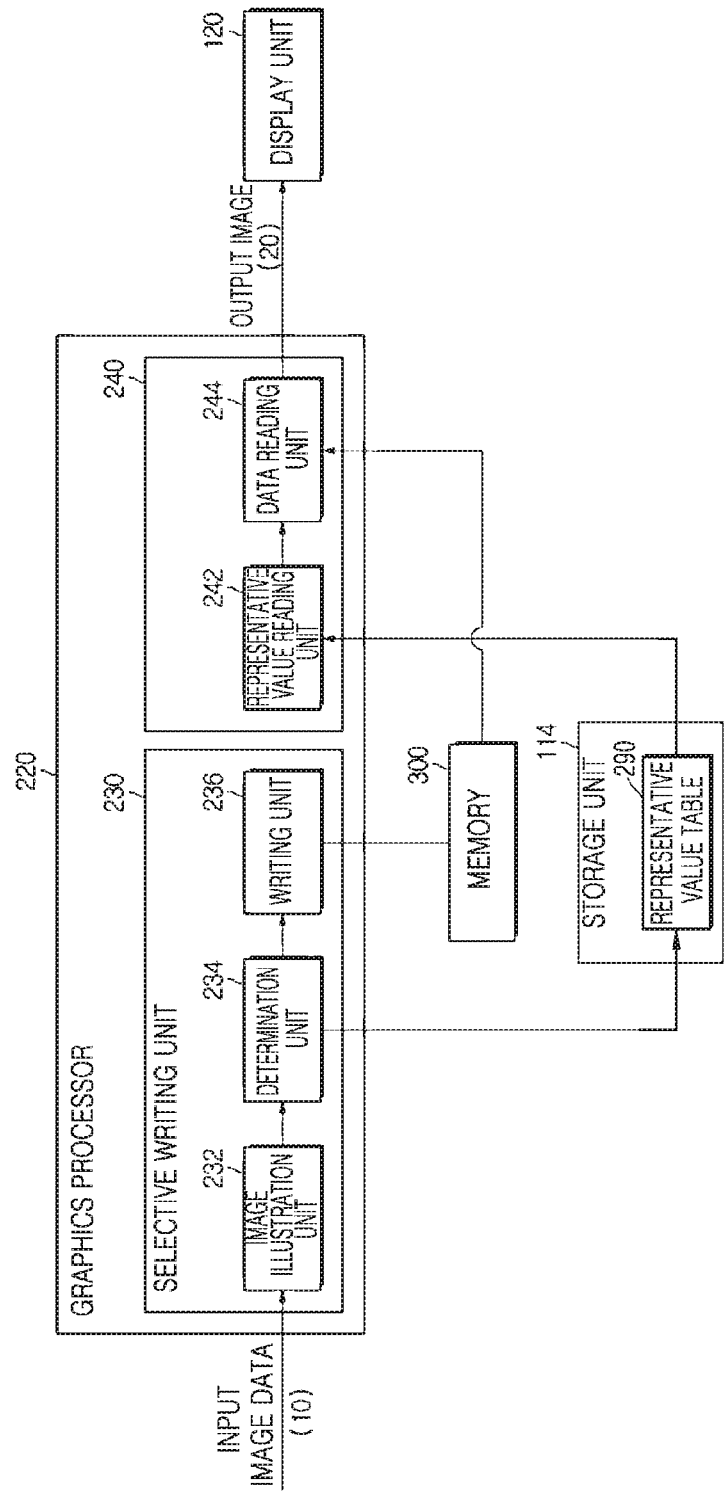

FIG. 4B

| p1-1 | p1-2 | p1-3 | p1-4 | p1-5 | p1-6 | p1-7 | p1-8 | p1-9 | p1-10 |
|------|------|------|------|------|------|------|------|------|-------|
| p2-1 | p2-2 | p2-3 | p2-4 | p2-5 | p2-6 | p2-7 | p2-8 | p2-9 | p2-10 |
| p3-1 | p3-2 | p3-3 | p3-4 | p3-5 | p3-6 | p3-7 | p3-8 | p3-9 | p3-10 |
| ⋮ | ⋮ | ⋮ | ⋮ | ⋮ | ⋮ | ⋮ | ⋮ | ⋮ | ⋮ |
| p8-1 | p8-2 | p8-3 | p8-4 | p8-5 | p8-6 | p8-7 | p8-8 | p8-9 | p8-10 |
| p9-1 | p9-2 | p9-3 | p9-4 | p9-5 | p9-6 | p9-7 | p9-8 | p9-9 | p9-10 |

| TABLE | |
|---|---|
| INDEX | FIRST BLOCK |
| FIRST BLOCK | 0   ←—291 |
| SECOND BLOCK | 0   ←—292 |
| THIRD BLOCK | 0   ←—293 |
| ⋮ | ⋮ |
| NTH BLOCK | 1   ←—294 |
| (N+1)TH BLOCK | 1   ←—295 |
| (N+2)TH BLOCK | 1   ←—296 |
| ⋮ | ⋮ |

290

FIG. 15
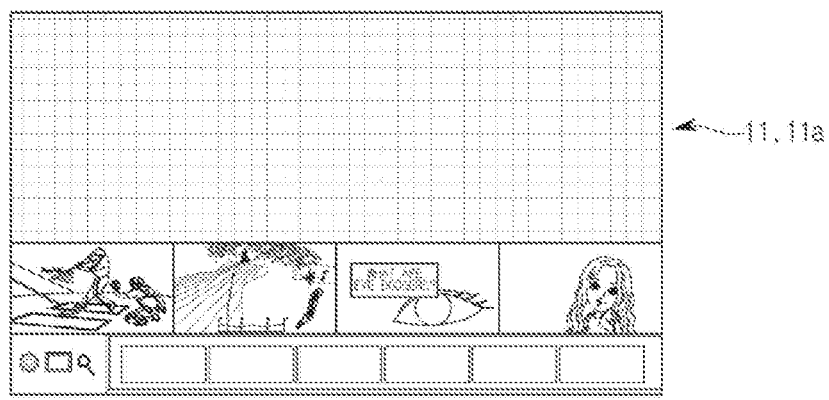
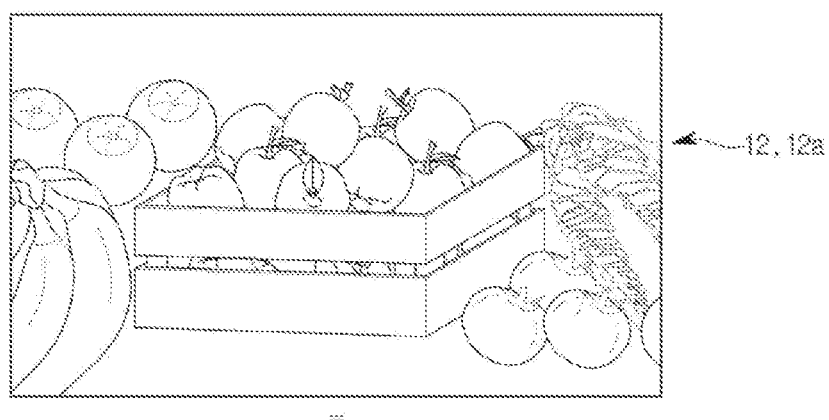
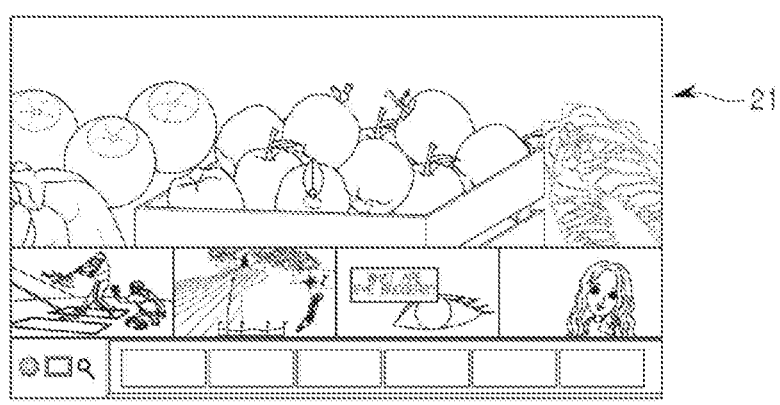

IMAGE PROCESSING APPARATUS AND METHOD FOR CONTROLLING THE SAME

CROSS-REFERENCE TO RELATED APPLICATION

This application claims the benefit of Korean Patent Application No. 10-2017-0085560, filed on Jul. 5, 2017, in the Korean Intellectual Property Office, the disclosure of which is incorporated herein in its entirety by reference.

BACKGROUND

Example embodiments of the inventive concepts relate to an image processing apparatus and/or a method of controlling the image processing apparatus.

An image processing apparatus may convert electrical signals into visual information and display the visual information to a user. Examples of the image processing apparatus may include a set-top box, a monitor device of a television or a desktop computer, an indoor or outdoor billboard capable of performing a display function, and the like, and may also include a portable terminal device such as a laptop computer, a cellular phone, a smart phone, a tablet PC, a personal digital assistant (PDA), a navigation device, and a portable game machine.

The image processing apparatus may include a display panel capable of displaying an image to the outside. The display panel includes a liquid crystal display (LCD) using a liquid crystal, a display panel using a light-emitting diode (LED), a display panel using an organic light-emitting diode (OLED), or a display panel using an active-matrix organic light-emitting diode.

SUMMARY

Some example embodiments of the inventive concepts provide an image processing apparatus capable of appropriately and efficiently using resources provided therein.

In some example embodiments, the image processing apparatus includes a memory; and a processor configured to selectively store image data of pixels of a zone set in a first image frame in an area of the memory, which corresponds to the zone, based on whether at least one of the pixels of the zone satisfies a condition such that the processor is configured to not store the image data of each of the pixels of the zone in the area of the memory in response to all the pixels of the zone satisfying the condition.

According to some other example embodiments of the inventive concepts, there is provided a method of controlling an image processing apparatus.

In some example embodiments, the method includes determining whether at least one pixel of a zone in a first image frame satisfies a condition; and selectively storing image data corresponding to all pixels of the zone in an area of a memory, which corresponds to the zone, based on whether the at least one pixel of the zone satisfies the condition such that the selectively storing does not store the image data corresponding to each of the pixels of the zone in the area of the memory in response to all the pixels of the zone satisfying the condition.

BRIEF DESCRIPTION OF THE DRAWINGS

Example embodiments of the inventive concepts will be more clearly understood from the following detailed description taken in conjunction with the accompanying drawings in which:

FIG. 3 is a block diagram of a graphics processor according to an example embodiment;

FIG. 4B is a diagram for explaining a block set in a first image;

FIG. 9 is a diagram illustrating an example of a table in which a first representative value and a second representative value are stored;

FIG. 15 is a view illustrating an example in which a first image and a second image are combined with each other;

DETAILED DESCRIPTION

Figure 1:
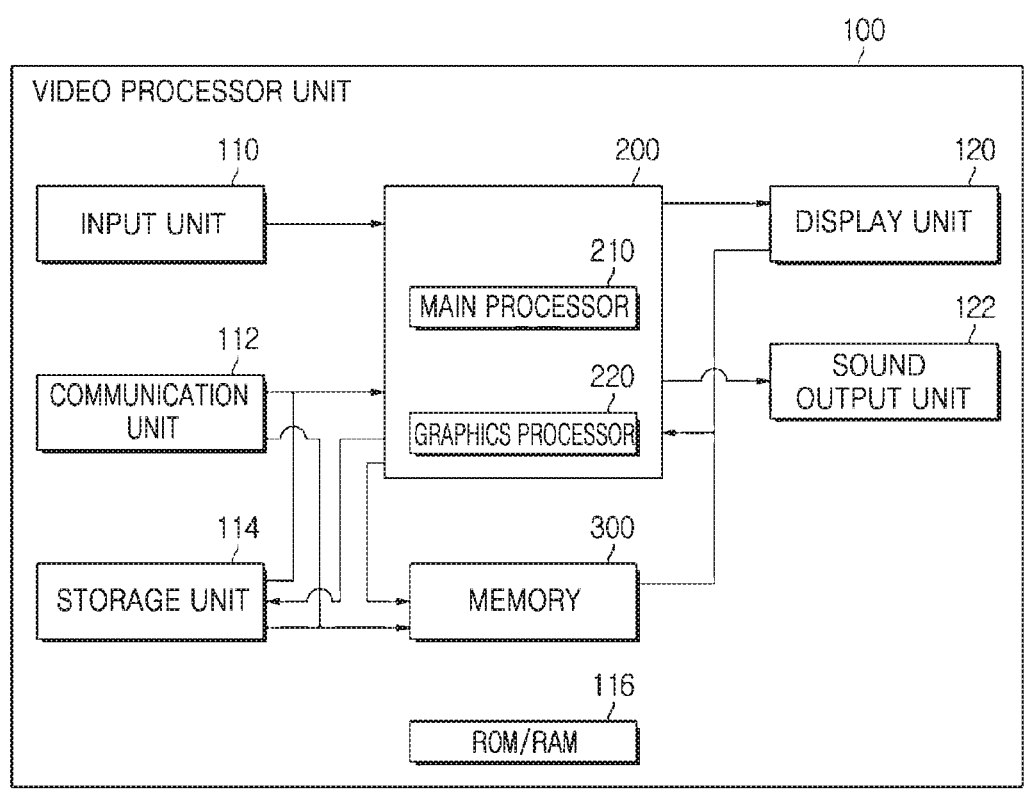
FIG. 1 is a block diagram of an image processing apparatus according to an example embodiment.

Hereinafter, an image processing apparatus according to an example embodiment will be described with reference to FIGS. 1 to 15. Like reference numerals denote like elements in the drawings, and redundant description thereof will be omitted.

FIG. 1 is a block diagram of an image processing apparatus 100 according to an example embodiment.

Referring to FIG. 1, the image processing apparatus 100 refers to an apparatus capable of performing a certain process on an input image and acquiring a processed image. The image processing apparatus 100 may include, for example, a display device for visually displaying an image to the outside by using a display unit 120 (or, alternatively, a display device).

More specifically, examples of the image processing apparatus 100 may include a set-top box, a television, a monitor device, a desktop computer, a laptop computer, a cellular phone, a smart phone, a tablet PC, a personal digital assistant, a navigation device, a portable game machine, a digital camera, a sound reproducer (MP3 player, etc.), a video switcher (which may be referred to as a video mixer), and various devices requiring image processing functions (for example, home appliances, vehicles, robots, machinery, construction equipment, vacuum cleaners, and/or robot cleaners). In addition to the listed examples, various types of apparatuses to which an example embodiment described below may be applied may be examples of the image processing apparatus 100.

The image processing apparatus 100 may include a processor 200 and a memory 300.

The image processing apparatus 100 may further include an input unit 110, a communication unit 112, a storage unit 114, read only memory (ROM) and/or random access memory (RAM) 116 (hereinafter, referred to as ROM/RAM 116), the display unit 120, and a sound output unit 122. In this case, at least one of the input unit 110, the communication unit 112, the storage unit 114, the ROM/RAM 116, the display unit 120, and the sound output unit 122 may be omitted as needed. At least two of the input unit 110, the communication unit 112, the storage unit 114, the ROM/RAM 116, the display unit 120, the sound output unit 122, the processor 200, and the memory 300 may be electrically connected to transmit and receive data.

The processor 200 may control all or some of the operations which the image processing apparatus 100 may perform. For example, the processor 200 may control the display unit 120 so that the display unit 120 displays an image input through at least one of the input unit 110 and the communication unit 112 or an image stored in the storage unit 114, or is configured such that the image processing apparatus 100 may perform an operation according to a user's command.

The processor 200 may be implemented using at least one semiconductor chip, circuit, and related components.

The processor 200 may include a main processor 210 and a graphics processor 220 according to an example embodiment.

The main processor 210 may control all operations of the image processing apparatus 100. For example, the main processor 210 may read an image from the storage unit 114 and transmit the image to the graphics processor 220 or the memory 300, and may store an image transferred through the communication unit 112 to the storage unit 114. Also, the main processor 210 may generate a control signal for the graphics processor 220 and transmit the control signal to the graphics processor 220 so that the graphics processor 220 may perform an operation.

The main processor 210 may be implemented using a central processing unit (CPU), a microcontroller unit (MCU), a microprocessor, an application processor (AP), an electronic control unit (ECU), and/or other electronic devices capable of generating signals for various operation processes and controls.

According to an example embodiment, the main processor 210 may perform all or some of the operations of the graphics processor 220 described below.

The graphics processor 220 may perform a certain operation related to an image. For example, the graphics processor 220 may write all or a portion of the image acquired from the input unit 110, the communication unit 112, the storage unit 114, and/or the ROM/RAM 116 into the memory 300, and may read all or a portion of the image written and stored in the memory 300 and transmit the same to the display unit 120. A detailed description thereof is described below.

In addition, the graphics processor 220 may be configured to perform various image processing operations on an acquired image, for example, filtering processing and compression.

The graphics processor 220 may be implemented using one or more semiconductor chips and related components such as a substrate.

The graphics processor 220 may be implemented using, for example, a graphics processing unit (GPU) or a graphics card mounted with a graphics processor.

The memory 300 may store all or a portion of an input image in accordance with the operation of at least one of the main processor 210 and the graphics processor 220. The memory 300 may include a plurality of writing areas (for example, writing areas 301 to 313 in FIG. 10) so that an image may be recorded therein.

The memory 300 may be implemented using dynamic random access memory (DRAM), static random access memory (SRAM), and/or a flash memory.

According to an example embodiment, the memory 300 may include a frame buffer memory (hereinafter, referred to as a frame buffer). The frame buffer denotes a storage device capable of temporarily storing image data corresponding to each pixel. Specifically, the frame buffer is configured to store values (for example, on/off state data, color data, etc.) assigned to each pixel of an image (each frame of a moving image may be included therein) to correspond to each pixel. Here, the pixel denotes a minimum unit constituting one image. The main processor 210 or the graphics processor 220 of the processor 200 may convert an image to be displayed into data and temporarily store the data in a frame buffer. The display unit 120 may display an input image as the input image is by displaying a value, stored in the frame buffer and assigned to each pixel, at a position corresponding to each pixel. Image data corresponding to each pixel may include RGB values. However, the image data corresponding to each pixel is not limited thereto and may include other data that may be considered by a designer.

The detailed operation of the memory 300 is described below.

The input unit 110 may receive data (for example, image data) from the outside. The input unit 110 may include, for example, a connection terminal and an associated part, which allow other devices to be mounted and dismounted. The connection terminal may be at least one of various interface terminals capable of transmitting and receiving data, for example, a universal serial bus (USB) terminal, a high definition multimedia interface (HDMI) terminal, a digital visual interface (DVI) terminal, a SATA terminal, and a thunderbolt terminal.

The communication unit 112 may receive data (for example, image data, audio data, metadata of image data, applications, etc.) from another device (for example, a server) and/or may transmit data to another device located remotely.

According to an example embodiment, the communication unit 112 may be connected to a wired communication network and/or a wireless communication network and communicate with the outside. The wired communication network may be implemented using a cable such as a pair cable, a coaxial cable, an optical fiber cable, or an Ethernet cable. The wireless communication network may be implemented using local area communication technology, for example, CAN communication, Wi-Fi, ZigBee, Bluetooth, Wi-Fi direct, Bluetooth low energy, or near field communication (NFC), and/or may be implemented using mobile communication technology, for example, communication technology based on a mobile communication standard such as 3GPP, 3GPP2 or WiMAX series.

The storage unit 114 may store various kinds of information required for calculations, processing, or control operations of the processor 200 in an electronic form. For example, the storage unit 114 may store all or a portion of an application (which may be referred to as a program or an app) related to the operation of the processor 200, and/or may store data related to the operation of the processor 200. The storage unit 114 provides all or a portion of the stored application or data to the processor 200 upon a call by the processor 200. The application may be obtained through an electronic software distribution network connectable by the communication unit 112.

The storage unit 114 may be implemented using a magnetic disk storage medium such as a hard disk or a floppy disk, an optical medium such as a magnetic tape, a compact disk (CD), or a digital versatile disk (DVD), a magneto-optical medium such as a floptical disk, or a semiconductor storage device such as a secure digital (SD) card, a flash memory, or a solid state drive (SSD).

The ROM/RAM 116 may temporarily or non-temporarily store data or an application related to the operation of the processor 200. Image data provided from at least one of the input unit 110, the communication unit 112, and the storage unit 114 may be temporarily or non-temporarily stored in the ROM/RAM 116 before the image data is provided to at least one of the main processor 210 and the graphics processor 220 and/or while the image data is processed by at least one of the main processor 210 and the graphics processor 220.

The display unit 120 may receive an electrical signal and discontinuously or continuously display an image corresponding thereto.

The display unit 120 may include a display panel. The display panel may be implemented using a liquid crystal display (LCD), a light-emitting diode (LED), a plasma display panel (PDP), a quantum dot-liquid crystal display (QD-LCD), and/or a quantum dot light-emitting diode (QLED). The LED may include an organic light-emitting diode (OLED), and the OLED may include a passive matrix OLED (PMOLED) or an active matrix OLED (AMOLED). The display unit 120 may be implemented using other display panels that may be considered by a designer. Also, the display unit 120 may be implemented using a cathode ray tube (CRT).

The display unit 120 may further include a back light unit (BLU) as needed.

The sound output unit 122 may output a sound source (which may include a sound, a background sound, an effect sound, and the like) provided from at least one of the input unit 110, the communication unit 112, and the storage unit 114, under the control of the processor 200. The sound output unit 122 may output a sound source corresponding to an image displayed on the display unit 120. The sound output unit 122 may be implemented using at least one of a headset, earphones, and a speaker device.

Hereinafter, a process of displaying an image will be described with reference to FIG. 2.

Figure 2:
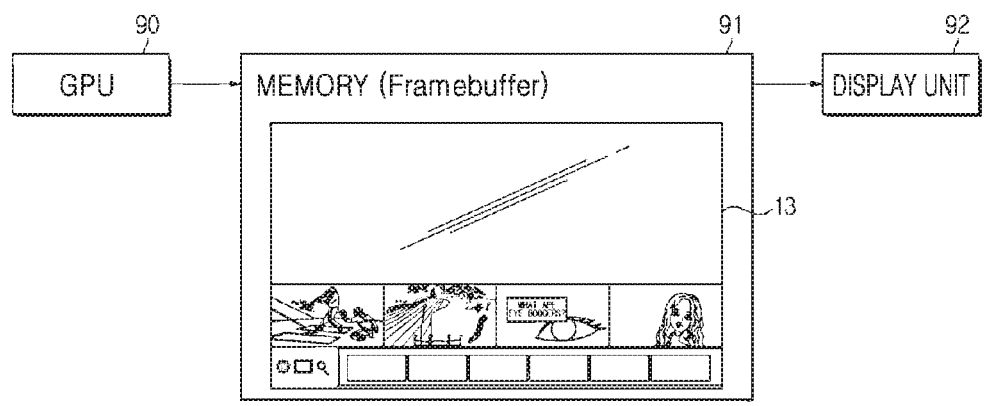
FIG. 2 is a view for explaining a process of displaying an image.

FIG. 2 is a view for explaining a process of displaying an image.

As shown in FIG. 2, when an image 13 for a full screen is received as data from an external CPU (not shown), a GPU 90 draws the image 13 for the full screen before a display unit 92 displays an image, and stores data, which corresponds to pixels of the image 13, in a frame buffer 91. In this case, the GPU 90 writes data of all the pixels of the image 13 transferred to the frame buffer 91 into the frame buffer 91. In other words, the GPU 90 sequentially and individually transmits the data of all the pixels of the image 13 to the frame buffer 91 after the image is drawn, and the frame buffer 91 sequentially stores the data. Data corresponding to each pixel stored in the frame buffer 91 is transmitted to the display unit 92, and the display unit 92 combines the data under the control of the CPU or the GPU 90 to display an image. As described above, according to the related art, since all data in an image is stored in the frame buffer 91, unnecessary data may be stored in the frame buffer 91 to thereby consume resources unnecessarily, and/or there may be a problem that a processing time until a display device displays an image after receiving the image is delayed. According to an example embodiment of the operation of the processor 200 described above, such a problem(s) may be solved.

Hereinafter, with reference to FIG. 3 to FIG. 14, various example embodiments of the operation of the processor 200 will be described in more detail. Various example embodiments of the operation of the processor 200 will be described based on example embodiments where operations are performed by the graphics processor 220 of the processor 200 for convenience. However, this is an example embodiment and it is also possible that the operations described below are designed to be performed by the main processor 210 depending on a designer's choice. In addition, it is also possible that some of the operations described below are designed to be performed by the graphics processor 220 and others are designed to be performed by the main processor 210, depending on a designer's choice.

Figure 4A:
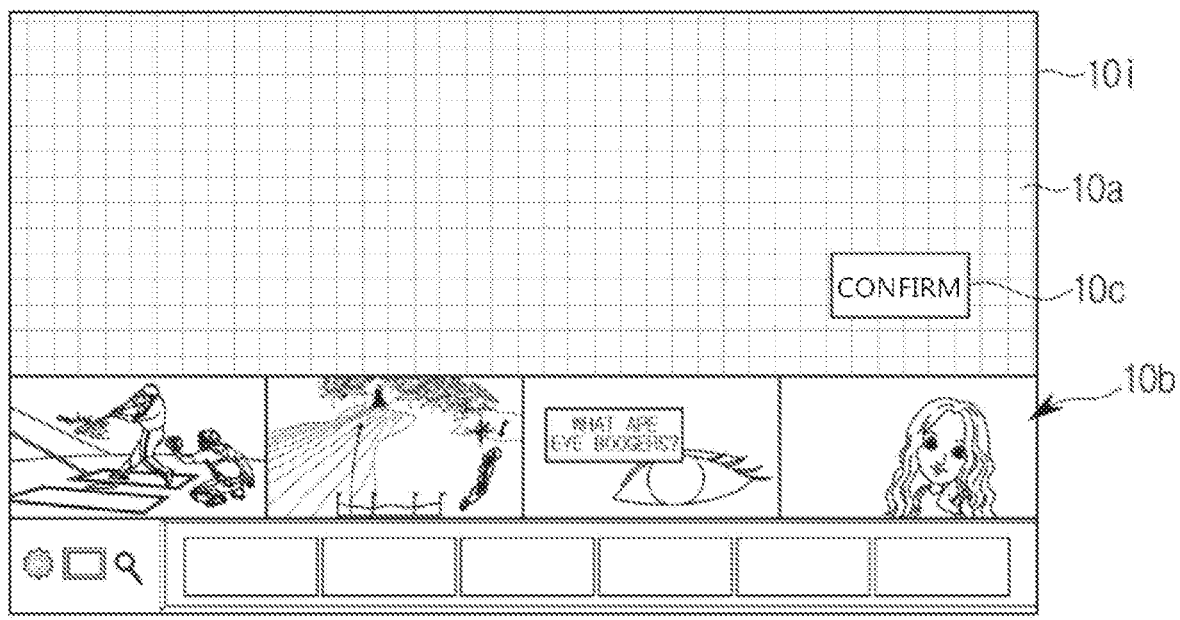
FIG. 4A is a view illustrating an example embodiment of a first image.

FIG. 3 is a block diagram of the graphics processor 220 according to an example embodiment, and FIG. 4A is a view illustrating an example embodiment of a first input image.

As shown in FIG. 3, the graphics processor 220 may include a selective writing unit 230 and a selective reading unit 240.

The selective writing unit 230 is configured to illustrate input image data 10, to determine whether all of the illustrated image data or at least a portion of the illustrated image data satisfies a certain condition (or, alternatively, a predefined condition) and to write or not to write the image data into the memory 300 based on a result of the determining. The image data 10 may include an image frame.

As discussed in more detail below, the certain condition may include, for example, at least one of whether or not pixels in the least a portion of the illustrated image data are transparent, whether or not the transparency of the pixels in the at least a portion is less than a desired (or, alternatively, a predefined) reference value, and whether or not image data corresponding to the pixels corresponds to a certain value.

The selective writing unit 230 may generate information on image data written in the memory 300 and image data unwritten in the memory 300. For example, the selective writing unit 230 may generate a representative value table 290 and may transmit the generated representative value table 290 to the selective reading unit 240.

Hereinafter, as an example embodiment of the operation of the selective writing unit 230, an example in which the selective writing unit 230 writes or does not write image data of each pixel in the memory 300 based on whether the image data of each pixel is transparent will be described.

According to an example embodiment, the selective writing unit 230 may include an image display unit 232, a determination unit 234, and a writing unit 236. In some example embodiments, the graphics processing unit (GPU) and/or the graphics card may be configured through execution of computer readable code or through layout design to perform the functions of the image display unit 232, the determination unit 234, and the writing unit 236.

As shown in FIG. 3, the image display unit 232 may receive the image data 10 forming at least one image from at least one of the input unit 110, the communication unit 112, and the storage unit 114 and may draw the received image data 10. An image drawn by the image display unit 232 is transmitted to the determination unit 234.

As shown in FIG. 4A, an image 10*i* corresponding to the received image data 10 may include a portion 10*a* (a portion having relatively low opacity. Hereinafter, referred to as a transparent portion) including transparent pixels or having relatively high transparency, and a portion 10*b* (a portion having relatively high opacity. Hereinafter, referred to as an opaque portion) including opaque pixels or having relatively low transparency.

According to an example embodiment, transparency or opacity may be defined, for example, as an alpha value. The alpha value is defined to have a value of 1 or a value close to 1 as the degree of opacity increases and to have a value of 0 or a value close to 0 as the degree of opacity decreases. Thus, when a certain pixel is completely opaque, the alpha value corresponding to the certain pixel is given as 1, and when a certain pixel is completely transparent, the alpha value corresponding to the certain pixel is given as 0. Transparency or opacity may be defined using other parameters that may be considered by a designer, in addition to the alpha value.

The transparent portion 10*a* and the opaque portion 10*b* may be arranged at certain positions in the image 10*i*. For example, the transparent portion 10*a* may be arranged on or under the opaque portion 10*b* and the opaque portion 10*b* may be arranged under or on the transparent portion 10*a*. Also, the transparent portion 10*a* and the opaque portion 10*b* may be arranged side by side to each other. In addition, the transparent portion 10*a* may be present around an opaque portion 10*c*. In other words, the opaque portion 10*c* may be located in a portion of an area where the transparent portion 10*a* is arranged overall. Conversely, a transparent portion (not shown) may be located in a portion of an area where the opaque portion 10*b* is located overall. In addition, the transparent portion 10*a* and the opaque portion 10*b* may be arranged in the image 10*i* in various ways that may be considered by a designer.

The determination unit 234 may determine transparency corresponding to each pixel in the image 10*i*. That is, the determination unit 234 may determine how transparent image data to be represented by each pixel is.

For example, the determination unit 234 may check the alpha value corresponding to each pixel and determine the transparency corresponding to each pixel based on a result of the checking. A determination result of the determination unit 234 may be transmitted to the writing unit 236. More specifically, the determination unit 234 may determine the transparency corresponding to each pixel by determining whether the alpha value of each pixel is 0 or less than a desired (or, alternatively, a predefined) value and whether the alpha value of each pixel is not 0 or greater than the value.

According to an example embodiment, the determination unit 234 may determine whether or not image data itself is present in each pixel.

FIG. 4B is a diagram for explaining a block set in a first image.

According to an example embodiment, the determination unit 234 may determine, in area units, whether image data corresponding to each pixel satisfies a certain condition. The area may include at least one of a block and a line. The block denotes a certain space that may be set in an image and has a width, and the line denotes a space that may be expressed in the form of 1×N. In other words, the determination unit 234 may determine, in block units, whether the image data of each pixel satisfies the certain condition, or may determine, in line units, whether the image data of each pixel satisfies the certain condition.

Furthermore, according to an example embodiment, the certain condition may include whether the transparency of a pixel corresponds to a certain range or whether image data (for example, an RGB value) of a pixel has a certain value.

When the certain condition is defined by how transparent a pixel is, the determination unit 234 may determine, in block units, the transparency of each pixel in a block, or may determine, in line units, the transparency of each pixel in a line.

For example, the determination unit 234 may set a block b1 in the image 10*i*, as shown in FIG. 4B, and determine the transparency of each of pixels p2_2 to p8_8 in the block b1. More specifically, the image 10*i* may include a plurality of pixels p1_1 to p10_10. The block b1 may be defined and set to include at least one pixel (e.g., the pixels p2_2 to p8_8) among the plurality of pixels p1_1 to p10_10 forming the image 10*i*.

In an example embodiment, the block b1 may include only some pixels p2_2 to p8_8 among the plurality of pixels p1_1 to p10_10 forming the image 10*i*. In this case, some pixels p2_2 to p8_8 among the plurality of pixels p1_1 to p10_10 forming the image 10*i* may be a set of pixels gathered in one zone of the image 10*i*. In another example embodiment, the block b1 may be defined and set to include all of the plurality of pixels p1_1 to p10_10 forming the image 10*i*. In other words, the entire image 10*i* may be set as one block b1.

FIGS. 5-8 are views illustrating various example embodiments of a set block.

The determination unit 234 may set a plurality of blocks b11 to b53, b61 to b93, b101 to b134, and b141 to b143 in an image 10*i*, as shown in FIGS. 5 to 8, and determine whether at least one pixel in each of the blocks b11 to b53, b61 to b93, b101 to b134, and b141 to b143 satisfies a certain condition, for each of the blocks b11 to b53, b61 to b93, b101 to b134, and b141 to b143. For example, the determination unit 234 may check the transparency of at least one pixel in each of the blocks b11 to b53, b61 to b93, b101 to b134, and b141 to b143, and may determine whether the at least one pixel satisfies the certain condition, based on a result of the checking.

According to an example embodiment, the plurality of blocks b11 to b53, b61 to b93, b101 to b134, and b141 to b143 may be defined to include all of a given one image, i.e., the image i10. In other words, when the plurality of blocks b11 to b53, b61 to b93, b101 to b134, and b141 to b143 are combined, the given one image, i.e., the image i10, is completely filled. In this case, the plurality of blocks b11 to b53, b61 to b93, b101 to b134, and b141 to b143 may partition the given one image, i.e., the image i10, into a plurality of zones.

According to another example embodiment, the plurality of blocks b11 to b53, b61 to b93, b101 to b134, and b141 to b143 may be defined only for a portion of the given one image, i.e., the image i10.

The shape and size of each of the plurality of blocks b11 to b53, b61 to b93, b101 to b134, and b141 to b143 may be variously defined according to a designer's choice. For example, the shape and size of each of the plurality of blocks b11 to b53, b61 to b93, b101 to b134, and b141 to b143 may be defined depending on the size of an image displayed on the display unit 120, the resolution of the image, and/or the aspect ratio of the image, or may be defined regardless of them.

Figure 5:
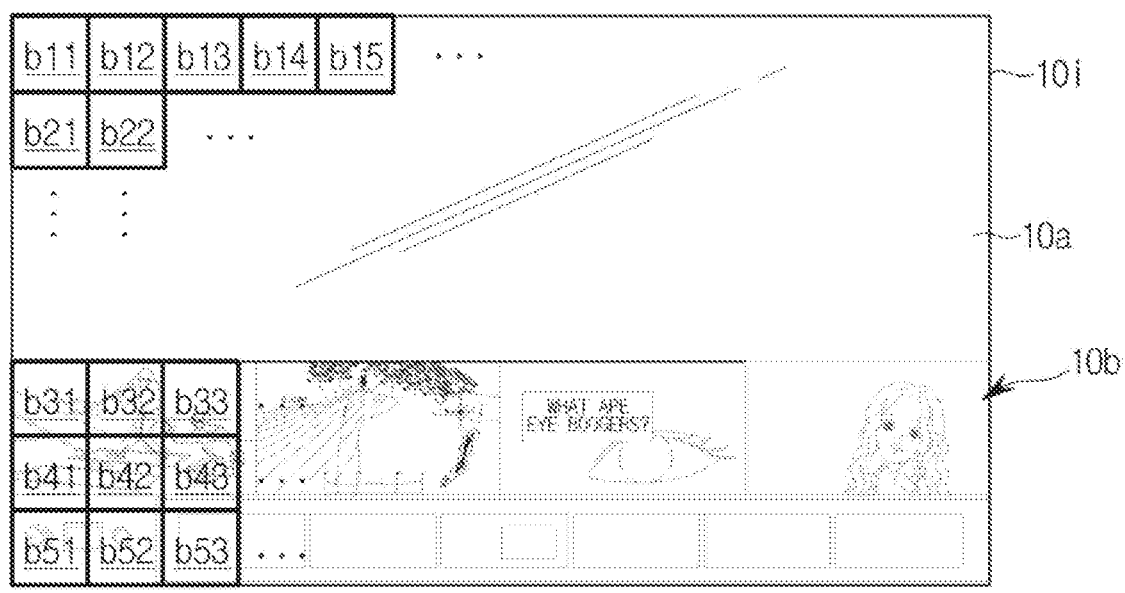
FIG. 5 is a view illustrating an example embodiment of a set block.

For example, according to an example embodiment, as shown in FIG. 5, the blocks b11 to b53 may be defined as square shapes having the same size. When each of the blocks b11 to b53 is defined as a square shape, each of the blocks b11 to b53 may include at least one pixel arranged in a an N*N matrix. Here, N is a natural number. For example, pixels of each of the blocks b11 to b53 may be arranged in a 16*16 matrix, a 32*32 matrix, or a 64*64 matrix. Each of the blocks b11 to b53 may be defined as a rectangular shape, a circular or rhombic shape, or another polygonal shape such as a triangle or a pentagon, in addition to the square shape. Even when each block has a shape other than the square shape, each block is defined to include at least one pixel. In this case, the blocks b11 to b53 may be defined such that the blocks b11 to b53 do not overlap each other.

Figure 6:
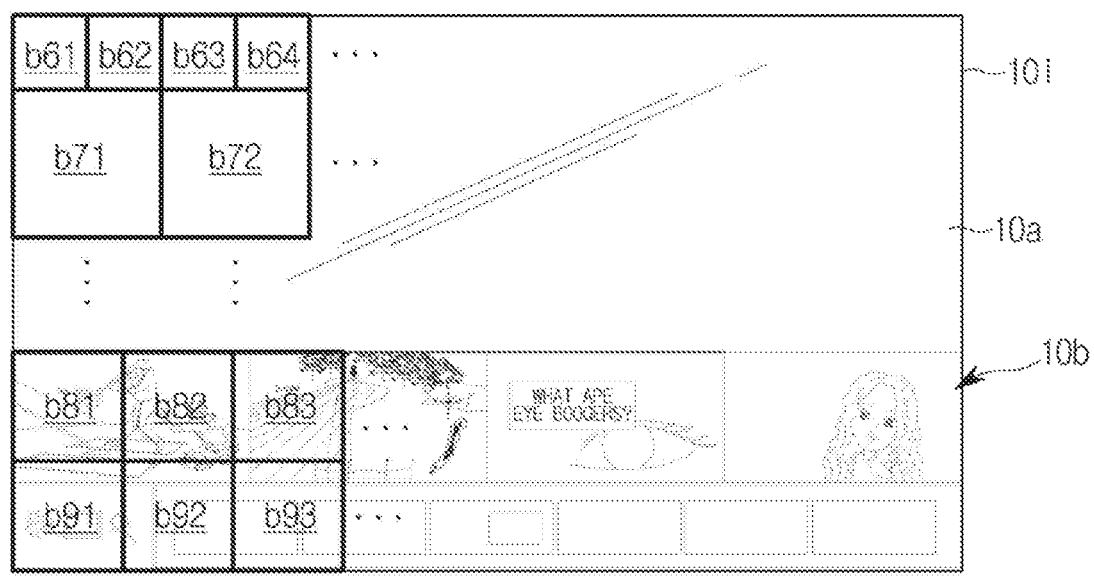
FIG. 6 is a view illustrating another example embodiment of the set block.

According to another example embodiment, as shown in FIG. 6, the sizes of the blocks b61 to b93 may be set to be different from each other, or partly to be different and partly to be equal to each other. For example, the blocks b71 to b72 corresponding to a certain zone may be defined as a relatively large size, and the blocks b61 to b64, b81 to b83, and b91 to b93 corresponding to a certain zone may be defined as a relatively small size. In this case, another zone corresponding to the blocks b71 to b72 defined as a relatively large size may be set to include an area in which it is predicted, considered, or determined that only a transparent portion 10a is present or only an opaque portion 10b is present. In addition, a zone corresponding to the blocks b61 to b64, b81 to b83, and b91 to b93 defined as a relatively small size may be set to include an area in which a transparent portion 10a and an opaque portion 10b are mixed or in which it is unclear whether the area is transparent or opaque. According to an example embodiment, the blocks b61 to b93 may have the same shape, for example, have a square shape, or may have a certain shape that may be considered by a designer as described above. According to another embodiment, some of the blocks b61 to b93 and the rest of the blocks b61 to b93 may have different shapes. For example, the blocks b71 to b72 defined as a relatively large size may have a rectangular shape, and the blocks b61 to b64, b81 to b83, and b91 to b93 defined as a relatively small size may have a square shape. It is also possible that all the blocks b61 to b93 have different shapes from each other.

Figure 7:
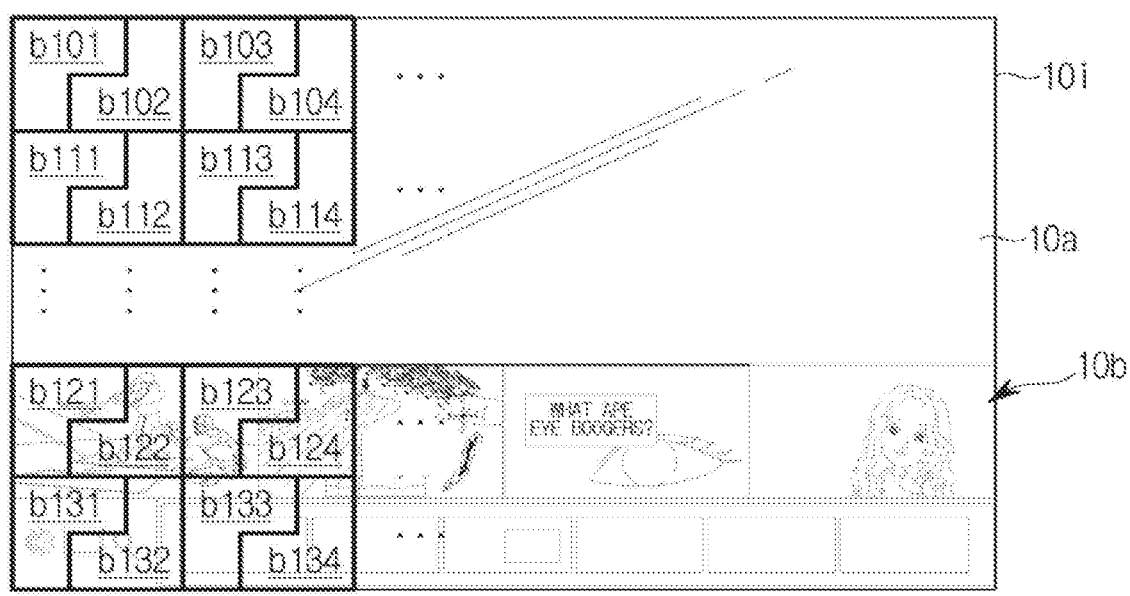
FIG. 7 is a view illustrating another example embodiment of the set block.

According to another embodiment, as shown in FIG. 7, the blocks b101, b103, b111, b113, b121, b123, b131, and b133 of a certain group of the plurality of blocks b101 to b134 may be set to have the same shape but have a different shape from the blocks b102, b104, b112, b114, b122, b124, b132, and b134 of the other group. In this case, the blocks b102, b104, b112, b114, b122, b124, b132, and b134 of the other group may have the same shape. For example, the blocks b101, b103, b111, b113, b121, b123, b131, and b133 of the certain group may have an L character shape and the blocks b102, b104, b112, b114, b122, b124, b132, and b134 of the other group may have an inverted L character shape corresponding to the L character shape.

Figure 8:
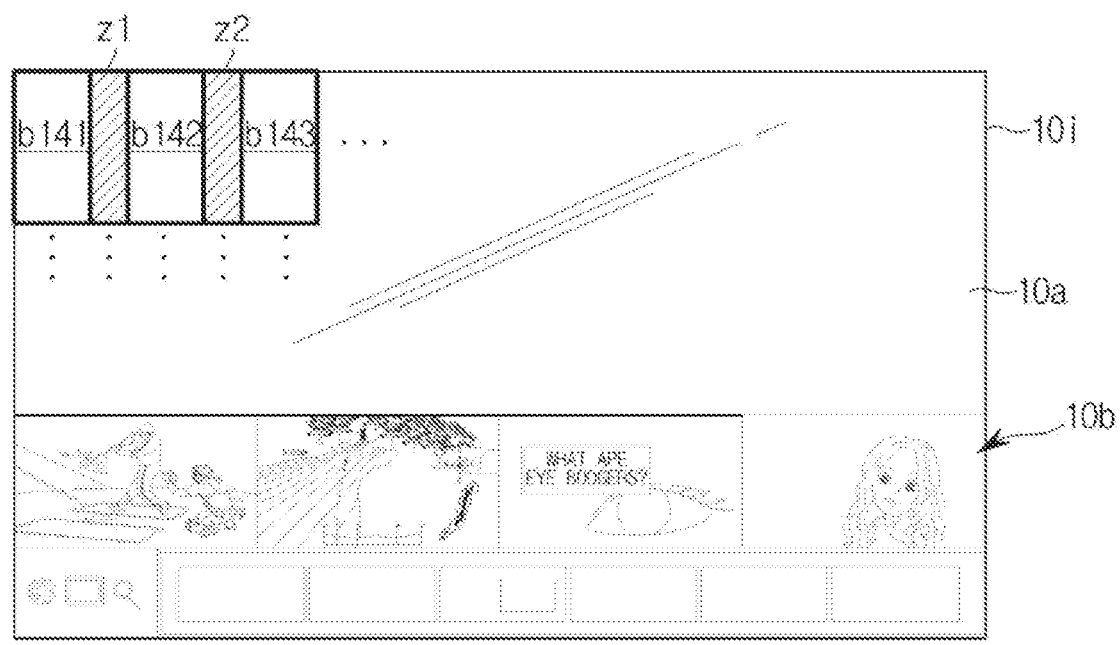
FIG. 8 is a view illustrating another example embodiment of the set block.

In addition, according to another embodiment, at least two blocks b141 and b142 or b142 and b143 of the blocks b141 to b143 may be defined to overlap each other, as shown in FIG. 8. In other words, the at least two blocks b141 and b142 may include a zone z1 that is shared thereby, and the at least two blocks b142 and b143 may include a zone z2 that is shared thereby.

Although various examples of setting and defining the plurality of blocks b11 to b53, b61 to b93, b101 to b134, and b141 to b143 in the image 10i have been described above, a method of setting the plurality of blocks b11 to b53, b61 to b93, b101 to b134, and b141 to b143 is not limited to the above-described embodiments. The plurality of blocks b11 to b53, b61 to b93, b101 to b134, and b141 to b143 may be set by a certain method that may be considered by a designer.

FIG. 9 is a diagram illustrating an example of a representative value table in which a first representative value and a second representative value are stored.

According to an example embodiment, the determination unit 234 may determine the transparency of at least one pixel in each of the blocks b11 to b53, b61 to b93, b101 to b134, and b141 to b143, and may determine a representative value corresponding to each of the blocks b11 to b53, b61 to b93, b101 to b134, and b141 to b143, based on a result of the determining the transparency of the at least one pixel.

Specifically, the determination unit 234 may determine whether or not alpha values of all of the pixels in each of the blocks b11 to b53, b61 to b93, b101 to b134, and b141 to b143 are 0, and/or may determine whether the alpha values of all of the pixels are less or greater than a desired (or, alternatively, a predefined) reference value, and may define representative values, which correspond to the blocks b11 to b53, b61 to b93, b101 to b134, and b141 to b143, differently based on a result of the determining.

More specifically, when the alpha values of all of the pixels in each of the blocks b11 to b53, b61 to b93, b101 to b134, and b141 to b143 are 0 and/or are less than the reference value, the determination unit 234 may determine a representative value, which corresponds to each of the blocks b11 to b53, b61 to b93, b101 to b134, and b141 to b143, as the first representative value. Conversely, when the alpha value of at least one pixel in each of the blocks b11 to b53, b61 to b93, b101 to b134, and b141 to b143 is not 0 and/or is greater than the reference value, the determination unit 234 may determine a representative value, which corresponds to each of the blocks b11 to b53, b61 to b93, b101 to b134, and b141 to b143, as the second representative value. Here, the second representative value is defined differently from the first representative value.

The first representative value and the second representative value may be arbitrarily defined by a designer to the extent that they may be mutually identified. For example, the first representative value may be defined as 0, and the second representative value may be defined as 1, as shown in FIG. 9.

When the representative values of the blocks b11 to b53, b61 to b93, b101 to b134, and b141 to b143 are defined, the determination unit 234 may transmit the representative values of the blocks b11 to b53, b61 to b93, b101 to b134, and b141 to b143 to the storage unit 114 to store the representative values in the storage unit 114, as shown in FIG. 3.

According to an example embodiment, the representative values of the blocks b11 to b53, b61 to b93, b101 to b134, and b141 to b143 may be stored in a storage medium other than the storage unit 114. For example, the representative values of the blocks b11 to b53, b61 to b93, b101 to b134, and b141 to b143 may be stored in the memory 300 such as a frame buffer.

The representative values of the blocks b11 to b53, b61 to b93, b101 to b134, and b141 to b143 may be stored as the representative value table 290.

Specifically, as shown in FIG. 9, the representative value table 290 may include fields indicating blocks, e.g., first to (N+2)th blocks 291 to 296, and representative value fields indicating representative values corresponding to the blocks. When the first representative value is defined as 0 and the second representative value is defined as 1, 0 may be recorded in the representative value fields corresponding to blocks (e.g., the first to third blocks 291 to 293) in which all pixels satisfy a condition, and 1 may be recorded in the representative value fields corresponding to blocks (e.g., the Nth to (N+2)th blocks 294 to 296) in which any one of the pixels does not satisfy the condition. For example, 0 may be recorded in a representative value field in which all pixels correspond to a transparent block, and 1 may be recorded in a representative value field in which at least one of the pixels corresponds to a non-transparent block.

The writing unit 236 may store image data in the memory 300 or block the storage of the image data in the memory 300, based on a determination result of the determination unit 234.

For example, if it is determined that certain blocks, for example, the first to third blocks 291 to 293, are transparent and/or image data corresponds to a certain value, the writing unit 236 may not store image data corresponding to pixels of each of the certain blocks, for example, the first to third blocks 291 to 293, in the memory 300. If it is determined that other certain blocks, for example, the Nth to (N+2) blocks 294 to 296, are opaque and/or image data does not correspond to a certain value, the writing unit 236 may store image data corresponding to pixels of each of the other certain blocks, for example, the Nth to (N+2) blocks 294 to 296, in the memory 300.

According to an example embodiment, when certain blocks (for example, the first to third blocks 291 to 293) are transparent and/or image data corresponds to a certain value, the writing unit 236 may remove only a write command for the certain blocks (for example, the first to third blocks 291 to 293) among write commands for all the blocks (i.e., the first to (N+2)th blocks 291 to 296) so that image data corresponding to the certain blocks (for example, the first to third blocks 291 to 293) are not written to the block 300. Furthermore, according to another embodiment, when certain blocks (for example, the first to third blocks 291 to 293) are transparent and/or image data corresponds to a certain value, the writing unit 236 may generate only a write command for other certain blocks (for example, the Nth to (N+2)th blocks 294 to 296) so that image data corresponding to the certain blocks (for example, the first to third blocks 291 to 293) are not written to the block 300.

Figure 10:
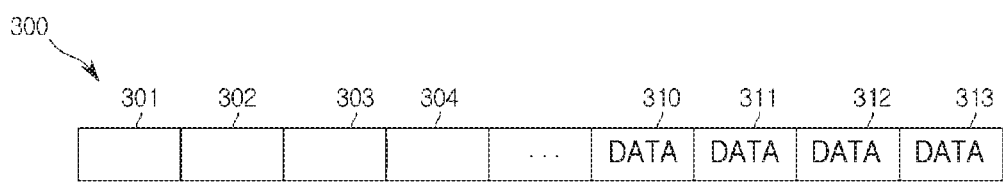
FIG. 10 is a diagram illustrating an example of storing image data in a memory.
Figure 11:
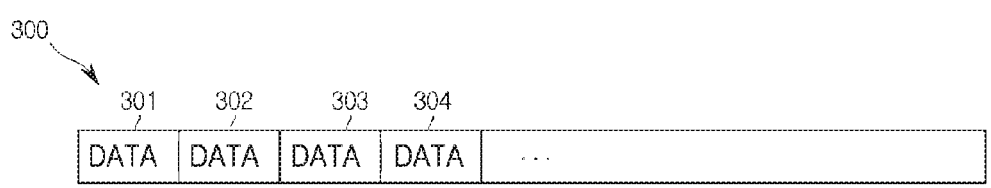
FIG. 11 is a diagram illustrating another example of storing image data in a memory.

FIG. 10 is a diagram illustrating an example of storing image data in a memory, and FIG. 11 is a diagram illustrating another example of storing image data in a memory.

When certain blocks (for example, the Nth to (N+2)th blocks 294 to 296) are opaque, the writing unit 236 may write image data corresponding to the certain blocks (for example, the Nth to (N+2)th blocks 294 to 296) in at least one writing area of the memory 300. In this case, as shown in FIGS. 10 and 11, the writing unit 236 may store the image data corresponding to the certain blocks (for example, the Nth to (N+2)th blocks 294 to 296) in certain writing areas 301 to 304 and 310 to 313 corresponding to the certain blocks (for example, the Nth to (N+2)th blocks 294 to 296). The certain writing areas 301 to 304 and 310 to 313 corresponding to the certain blocks (for example, the Nth to (N+2)th blocks 294 to 296) may be defined in advance, or may be arbitrarily selected by a processor.

According to an example embodiment, the writing unit 236 may sequentially access the writing areas 301 to 304 and 310 to 313 of the memory 300, as shown in FIGS. 10 and 11.

In other words, data may be sequentially written from the writing area 301, which is a first writing area, to the writing area 313, which is a last writing area. According to another embodiment, the writing unit 236 may arbitrarily access the writing areas 301 to 304 and 310 to 313 of the memory 300.

An address may be further stored in or assigned to each of the writing areas 301 to 304 and 310 to 313 of the memory 300 in order to identify image data corresponding to each of the writing areas 301 to 304 and 310 to 313 as needed. When the writing unit 236 sequentially accesses the writing areas 301 to 304 and 310 to 313 of the memory 300 as described above, the order of each of the writing areas 301 to 304 and 310 to 313 may be used as the address. In this case, the address storage or assignment for each of the writing areas 301 to 304 and 310 to 313 may be omitted.

According to an example embodiment, as shown in FIG. 10, the writing unit 236 may write image data in the writing areas 310 to 313 other than the writing areas 301 to 304 corresponding to the blocks 291 to 293 (for example, blocks in which all the pixels are transparent), in which all the pixels satisfy a desired (or, alternatively, a predefined) condition, among the writing areas 301 to 304, 310 to 313 provided in the memory 300. For example, the writing unit 236 may be configured to sequentially accesses the writing areas 301 to 304 and 310 to 313 of the memory 300, not to write image data in the writing areas 301 to 304 corresponding to the blocks 291 to 293 in which all the pixels satisfy the condition, and to write image data in the writing areas 310 to 313 corresponding to the blocks 294 to 296 (for example, blocks in which at least one pixel is opaque) in which at least one pixel does not satisfy the condition. Accordingly, no data is stored in the writing areas 301 to 304 corresponding to the blocks 291 to 293 in which all the pixels satisfy the condition, and thus, the writing areas 301 to 304 are kept blank, and image data corresponding to the blocks 294 to 296 is written and present in the writing areas 310 to 313 corresponding to the blocks 294 to 296 in which at least one pixel does not satisfy the condition.

According to another embodiment, as shown in FIG. 11, the writing unit 236 may sequentially access the writing areas 301 to 304 of the memory 300 and sequentially store image data in the accessed writing areas 301 to 304. In this case, the image data includes image data corresponding to the blocks 294 to 296 in which at least one pixel does not satisfy the condition. In other words, the writing unit 236 may not exclude certain writing areas, i.e., the writing areas 301 to 304, from writing objects, and accordingly, the certain writing areas, i.e., the writing areas 301 to 304, are not kept blank.

As described above, the selective writing unit 230 may be configured to write or not to write each portion of image data of pixels in the memory 300 based on whether or not the image data corresponds to a certain value.

In this case, the image display unit 232 described above may receive the image data 10 forming at least one image and illustrate the at least one image in the same manner as described above.

The determination unit 234 described above may check image data of each pixel in a block or line in units of blocks or lines, compare the image data with a certain value, and determine whether the image data is the same as the certain value. The certain value may include a value indicating a certain color. The value indicating a certain color may include, for example, a value (i.e., (0, 0, 0)) indicating black, a value (i.e., (255, 255, 255)) indicating white, and/or a value (i.e., (0, 255, 0)) indicating green. In other words, the determination unit 234 may check whether each pixel in a block or line shows a certain color, in block or line units. In addition, the determination unit 234 may determine the first representative value and the second representative value based on a result of the checking and may transmit the determined first representative value and second representative value to the storage unit 114 as needed. The first representative value and the second representative value transmitted to the storage unit 114 may be stored as a representative value table.

The writing unit 236 described above may store image data in the memory 300 or block the storage of the image data in the memory 300, based on whether each pixel in a block or line shows a certain color. For example, when image data is the same as the certain value, the writing unit 236 may not store the image data in the memory 300, and on the contrary, when the image data is different from the certain value, the writing unit 236 may store the image data in the memory 300.

Figure 12:
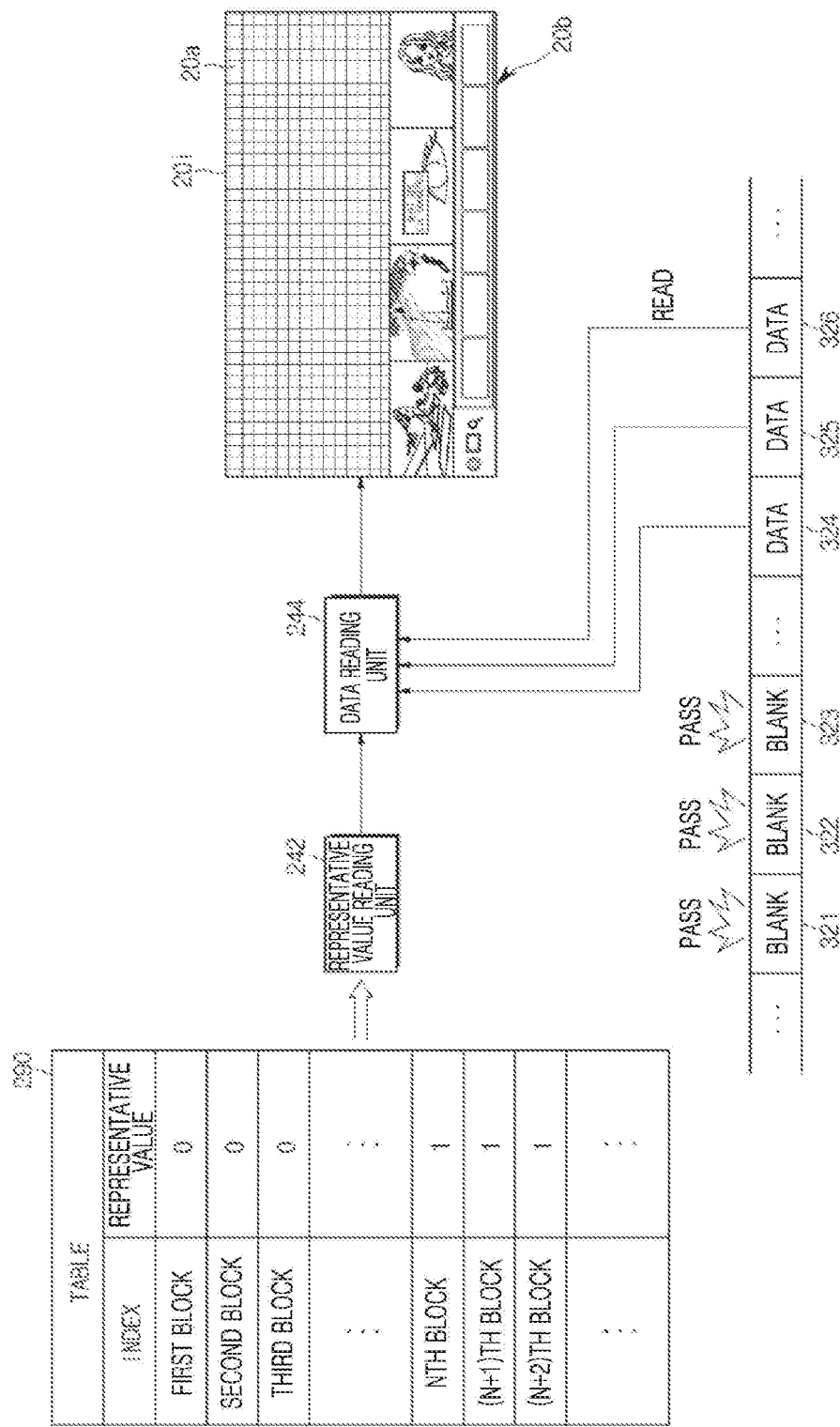
FIG. 12 is a diagram illustrating an example of reading image data from a memory.
Figure 13:
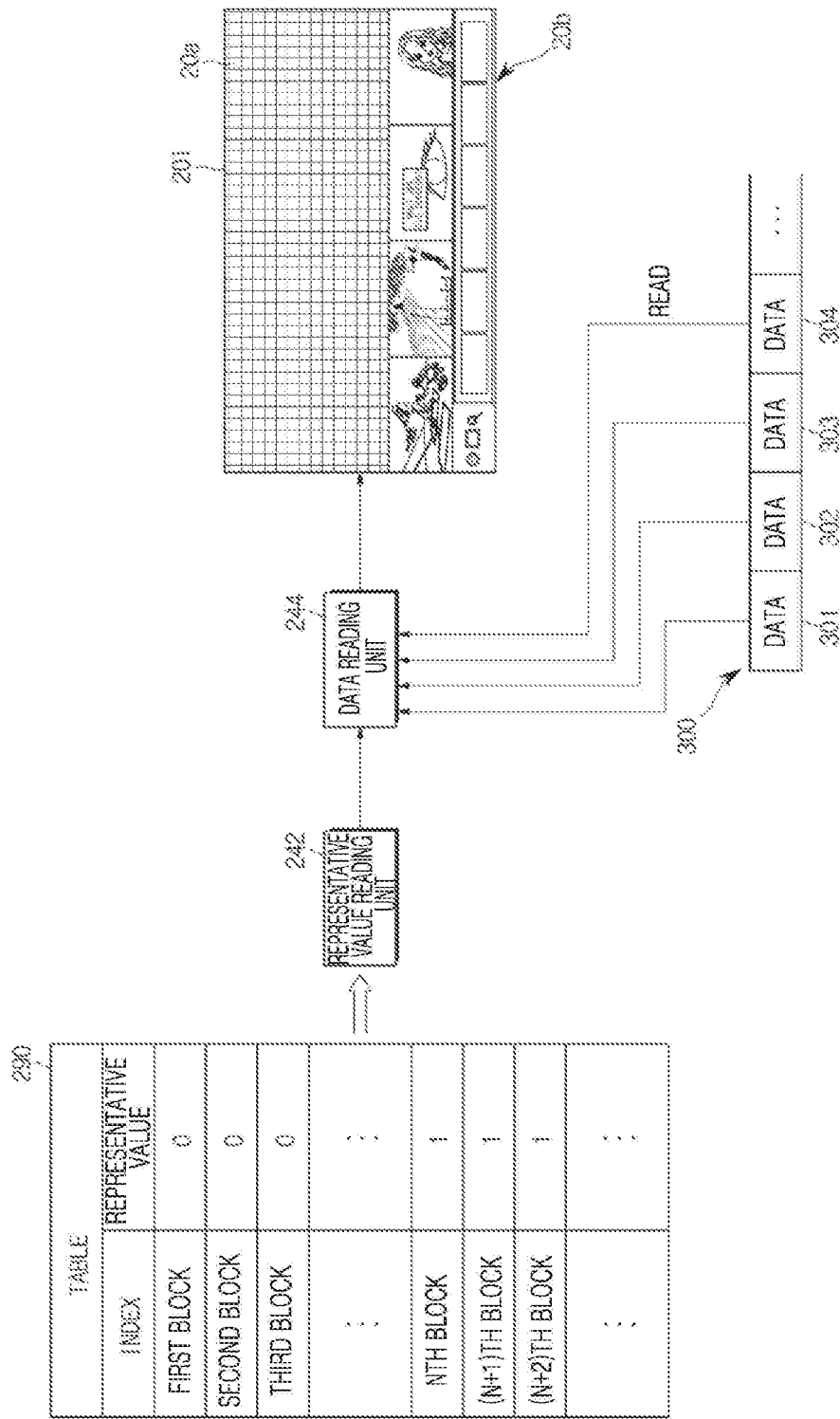
FIG. 13 is a diagram illustrating another example of reading image data from a memory.

FIG. 12 is a diagram illustrating an example of reading image data from a memory, and FIG. 13 is a diagram illustrating another example of reading image data from a memory.

The selective reading unit 240 shown in FIG. 3 may read data stored in the memory 200 and acquire an output image 20 based on the read data.

The selective reading unit 240 may include a representative value reading unit 242 and a data reading unit 244, as shown in FIG. 3.

The representative value reading unit 242 may acquire a representative value corresponding to each of the blocks 291 to 296, and may determine whether each of the blocks 291 to 296 is transparent or opaque, based on the representative value. In this case, the representative value reading unit 242 may receive a representative value corresponding to each of the blocks 291 to 296 directly from the selective writing unit 230, or may read the storage unit 114 or the memory 300 and acquire a representative value corresponding to each of the blocks 291 to 296.

As shown in FIGS. 12 and 13, representative values acquired by the representative value reading unit 242 may be transmitted to the data reading unit 244.

The data reading unit 244 may acquire or may not acquire image data corresponding to each of the blocks 291 to 296 from the memory 300, based on a representative value corresponding to at least one of the blocks 291 to 296.

Specifically, when representative values corresponding to certain blocks (e.g., the blocks 291 to 293) are the first representative value, the data reading unit 244 may not acquire image data corresponding to the certain blocks (e.g., the blocks 291 to 293). On the contrary, when representative values corresponding to certain blocks (e.g., the blocks 294 to 296) are the second representative value, the data reading unit 244 may acquire image data corresponding to the certain blocks (e.g., the blocks 294 to 296).

According to an example embodiment, the data reading unit 244 may sequentially access the writing areas 301 to 304 and 321 to 326 of the memory 300.

In this case, as shown in FIG. 12, the data reading unit 244 may not perform reading of image data on certain writing areas (e.g., the writing areas 321 to 323) of the writing areas 301 to 304 and 321 to 326 and may perform reading of image data on other certain writing areas (e.g., the writing areas 324 to 326). The certain writing areas (e.g., the writing areas 321 to 323) include writing areas corresponding to the blocks 291 to 293 in which pixels satisfy a desired (or, alternatively, a predefined) condition, and the other certain writing areas (e.g., the writing areas 324 to 326) include writing areas corresponding to the blocks 294 to 296 in which pixels do not satisfy the predefined condition.

In other words, as described with reference to FIG. 10, among the writing areas 301 to 304 and 310 to 313 provided in the memory 300, the writing areas 301 to 304 corresponding to the blocks 291 to 293 in which pixels satisfy a predefined condition may be blank and the writing areas 310 to 313 corresponding to the blocks 294 to 296 in which at least one pixel does not satisfy the predefined condition may have image data. In this case, as shown in FIG. 12, the data reading unit 244 may sequentially access the writing areas 301 to 313, pass through the writing areas 301 to 304 without reading data from the writing areas 301 to 304 when the writing areas 301 to 304, which correspond to the blocks 291 to 293 in which pixels satisfy a predefined condition, are accessed, and read image data from the writing areas 310 to 313 when the writing areas 310 to 313, which correspond to the blocks 294 to 296 in which at least one pixel does not satisfy the predefined condition, are accessed. As described above, whether all the pixels in each of the writing areas 301 to 304 and 310 to 313 satisfy a predefined condition or whether at least one of the pixels in each of the writing areas 301 to 304 and 310 to 313 does not satisfy the predefined condition may be determined based on a representative value corresponding to each of the blocks 291 to 296.

As described with reference to FIG. 11, when the writing areas 301 to 304 of the memory 300 have image data corresponding to the blocks 294 to 296 in which at least one pixel does not satisfy a predefined condition, and are not blank, the data reading unit 244 reads and acquires image data from each of the writing areas 301 and 302 in an arbitrary or predefined order, as shown in FIG. 13. In this case, the data reading unit 244 may determine and identify which one of the blocks 294 to 296 corresponds to image data stored in each of the writing areas 301 to 302, by using a representative value. In this case, the representative value table 290 may be used again.

Image data read from the memory 300 by the data reading unit 244 forms an output image 20i. In this case, the output image 20i may be the same as or similar to the input image 10i. When the input image 10i includes the transparent portion 10a, the data reading unit 244 may not acquire image data corresponding to the transparent portion 10a. The data reading unit 244 processes a portion of the output image 20i, in which image data is not acquired, as a transparent part. Accordingly, the output image 20i includes a transparent portion 20a, like the input image 10i. The transparent portion 20a of the output image 20i corresponds to the transparent portion 10a of the input image 10i. Similarly, the output image 20i may include an opaque portion 20b corresponding to the opaque portion 10b of the input image 10i. The opaque portion 20b is formed by image data read from the memory 300.

When the above-described block is set for the entire image, the above-described process may be used to determine whether at least one input image (for example, at least one frame of a moving image) is a transparent image. Specifically, when alpha values of all pixels in an input image are 0 or less than a predefined value, a representative value of a block entirely including the input image is set to a first representative value, and accordingly, no information corresponding to the input image is stored in the memory 300. The data reading unit 244 does not acquire any information from the memory 300 by using the first representative value and determines that an output image corresponding to the input image is transparent. In contrast, when an alpha value of at least one pixel in the input image is not 0 or greater than a predefined value, a representative value of a block entirely including the input image is set to a second representative value, and accordingly, data of each pixel of the input image is stored in the memory 300. Accordingly, the data reading unit 244 acquires image data for all pixels from the memory 300 according to the second representative value, and an output image corresponding to the input image is displayed as the input image is by the display unit 120.

As described above, the graphics processor 220 may store data in the memory 300 and determine a representative value, based on a result of determining whether or not pixels, to which image data is assigned in block units, satisfy a predefined condition, and then may read image data from the memory 300 based on the determined representative value. However, as described above, the graphics processor 220 may store data in the memory 300 and determine a representative value, based on whether or not pixels, to which image data is assigned in line units, satisfy a predefined condition, and then may read image data from the memory 300 based on the determined representative value.

The operations of the selective writing unit 230 and the selective reading unit 240 described above may be performed in real time or non-real time.

The selective writing unit 230 and the selective reading unit 240 may sequentially and almost simultaneously perform the above-described operations. For example, when a write operation of writing image data of at least one block to the memory 300 or the blocking of the write operation is performed by the selective writing unit 230, a read operation of reading image data of at least one block from the memory 300 or the blocking of the read operation may be performed by the selective reading unit 240 immediately or after the elapse of a predefined time.

The selective writing unit 230, the selective reading unit 240, the image display unit 232, the determination unit 234, the writing unit 236, the representative value reading unit 242, and the data reading unit 244 may be physically separated from one another and/or logically separated from one another. When they are physically separated from one another, each of at least two of them may be implemented using at least one semiconductor chip. According to an example embodiment, they may be implemented using one semiconductor chip.

As described above, since the graphics processor 220 may store data in the memory 300 and determine a representative value, based on whether at least one pixel in a block or line satisfies a predefined condition, and may determine whether or not to read image data from the memory 300 based on the determined representative value, the graphics processor 200 may omit unnecessary writing and/or reading of image data. Accordingly, resources of the image processing apparatus 100 may be saved and data writing and reading may be performed more quickly, and thus, an operation speed of the image processing apparatus 100 increases.

Also, as described above, when the selective writing unit 230 operates to write or not to write each portion of image data of a pixel in the memory 300 based on whether the image data of the pixel corresponds to a certain value, image data of a certain color is not stored in the memory 300. For example, when a certain value is defined as a green RGB value or a blue RGB value, a green portion or blue portion of an image is not stored in the memory 300 depending on an operation of the selective writing unit 230. Accordingly, the selective reading unit 240 may not acquire data for the green portion or the blue portion.

Such an operation may be applied to a case of combining images by using a chroma key. Generally, to combine a plurality of images by using a chroma key, it is necessary to remove a green portion or blue portion in at least one image. However, when the selective writing unit 230 and the selective reading unit 240 operate as described above, it is not necessary to perform a process of removing a green portion or blue portion in at least one image, and thus, image combination may be performed more quickly.

Hereinafter, another embodiment of the graphics processor 220 in FIG. 1 will be described with reference to FIGS. 14 and 15.

Figure 14:
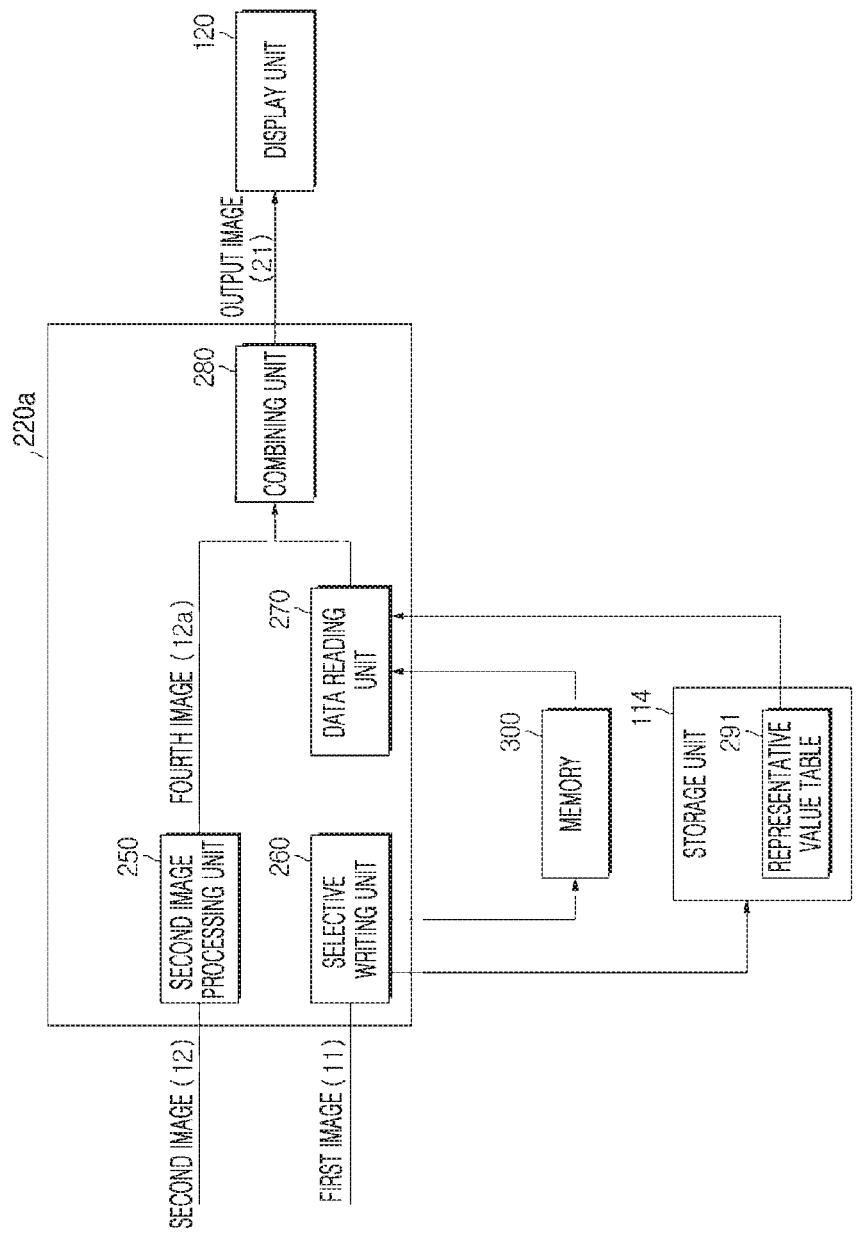
FIG. 14 is a block diagram of a graphics processor according to another example embodiment.

FIG. 14 is a block diagram of a graphics processor 220a according to another embodiment, and FIG. 15 is a view illustrating an example in which a first image 11 and a second image 12 are combined with each other.

The graphics processor 220a according to another embodiment may be provided in the image processing apparatus 100 in place of the graphics processor 220 described above or in addition to the graphics processor 220 described above.

Referring to FIG. 14, the graphics processor 220a according to another embodiment may include a second image processing unit 250, a selective writing unit 260, a data reading unit 270, and a combining unit 280. The second image processing unit 250 and the combining unit 280 may be electrically connected to each other to enable data transmission and reception, and the data reading unit 270 and the combining unit 280 may also be electrically connected to each other to enable data transmission and reception. The second image processing unit 250, the selective writing unit 260, the data reading unit 270, and the combining unit 280 may be logically separated from one another or may be physically separated from one another.

The second image processing unit 250 may receive the second image 12, perform necessary processing on the second image 12, and then transmit a fourth image 12a generated and acquired by performing the necessary processing to the combining unit 280.

The second image 12 denotes an original image of the fourth image 12a to be combined with the first image 11. The second image 12 may be an image transmitted from at least one of the input unit 110, the communication unit 112, and the storage unit 114 to the graphics processor 220a.

The second image 12 may include a typical image, for example, as shown in FIG. 15. The typical image may include at least one frame image constituting a still image and a moving image. In this case, the second image 12 may be an image having no or almost no transparent portion over the entire screen. Furthermore, in another example, the second image 12 may be an image whose portion is a transparent image. In this case, a portion corresponding to an opaque portion of the first image 11 may be a transparent image.

When all or most of the second image 12 is opaque, as shown in FIG. 2, the second image processing unit 250 may generate the second image 12 and write all blocks (not shown) of the second image 12 to the memory 300, and may acquire a fourth image 12a after simultaneously or sequentially reading image data written in the memory 300 and transmit the fourth image 12a to the combining unit 280. In this case, the fourth image 12a may be the same as or substantially the same as the second image 12.

When a portion of the second image 12 is transparent, the second image processing unit 250 may store the second image 12 in the memory 300 and read the second image 12 from the memory 300, by using methods that are the same as or partially modified from those of the selective writing unit 230 and the selective reading unit 240 described above.

In other words, the second image processing unit 250 may write and store a block, which includes at least one pixel that does not satisfy a predefined condition from among a plurality of blocks definable in the second image 12, in the memory 300, and may not write a block, which includes only pixels satisfying the predefined condition, in the memory 300. In addition, the second image processing unit 250 may read only image data of pixels in a block in which there is at least one pixel that does not satisfy a predefined condition, from among image data stored in the memory 300, and may transmit the read image data to the combining unit 280. In order to perform such an operation, the second image processing unit 250 may further generate a representative value table 290 as described above.

Like the selective writing unit 230 shown in FIG. 3, the selective writing unit 260 may receive the first image 11 and write and store image data, which corresponds to a block in which there is at least one pixel that does not satisfy a predefined condition from among a plurality of blocks definable in the first image 11, in the memory 300, and may not write image data, which corresponds to a block in which there is only pixels satisfying the predefined condition, in the memory 300. In addition, the selective writing unit 260 may further generate a representative value table 291.

The selective reading unit 270 may read image data written in the memory 300, and particularly, may read only image data corresponding to a block in which there is at least one pixel that does not satisfy a predefined condition. According to an example embodiment, the selective reading unit 270 may read the representative value table 291, and may read data from a portion of the memory 300 with reference to a representative value stored in the representative value table 291 and may not read data from other portions. In this case, the portion of the memory 300 includes a portion corresponding to a block in which there is at least one pixel that does not satisfy a predefined condition, and each of the other portions includes a portion corresponding to a block in which there are only pixels satisfying a predefined condition.

In addition, according to an example embodiment, the selective reading unit 270 may determine that data read with reference to a representative value of the representative value table 291 corresponds to a certain block (for example, a block including an opaque portion), and may determine that all portions, from which data is not read, are blocks (for example, blocks including only a transparent portion) other than the certain block.

The selective reading unit 270 may output an image corresponding to read image data, that is, a third image 11a, and transmit the third image 11a to the combining unit 280 by using a circuit or a conductive wire.

Since the selective writing unit 260 and the selective reading unit 270 have been described above, detailed descriptions of the operations and structures thereof will be omitted. In addition, among components shown in FIG. 13, the storage unit 114, the representative value table 291 stored in the storage unit 114, and the memory 300 have already been described in detail and thus detailed descriptions thereof will be omitted.

The combining unit 280 combines the third image 11a transmitted from the data reading unit 270 with a fourth image 12a transmitted from the second image processing unit 250 and outputs a composite image 21. Since the third image 11a and the fourth image 12a are substantially identical to the first image 11 and the second image 12, respectively, combining the third image 11a with the fourth image 12a corresponds to combining the first image 11 to the second image 12.

For example, the combining unit 280 may combine the third image 11a with the fourth image 12a by superimposing the third image 11a on the fourth image 12a or superimposing the fourth image 12a on the third image 11a, as shown in FIG. 15. In this case, the combining unit 280 may completely or roughly match the boundary of the third image 11a to the boundary of the fourth image 12a to combine the third image 11a with the fourth image 12a. The combining unit 280 may generate the composite image 21 by superimposing the third image 11a on the fourth image 12a or may generate the composite image 21 by superimposing the fourth image 12a on the third image 11a. When the composite image 21 is generated by superimposing the third image 11a on the fourth image 12a, a portion of the fourth image 12a, which is at the same position as a transparent portion of the third image 11a, may be represented in the composite image 21, and the other portion of the fourth image 12a, which is at the same position as an opaque portion of the third image 11a, may be shielded by the opaque portion of the third image 11a so as not to be expressed in the composite image 21. The opposite thereto may also be performed.

In addition, the combining unit 280 may combine the third image 11a with the fourth image 12a by using at least one of various methods that may be considered by a designer. For example, the combining unit 280 may combine the third image 11a with the fourth image 12a by arranging the third image 11a and the fourth image 12a in parallel to each other in a horizontal direction or in a vertical direction.

In addition, the combining unit 280 may change the resolution and/or the size of at least one of the third image 11a and the fourth image 12a, as needed, and then may combine a changed or unchanged third image with a changed or unchanged fourth image.

The composite image 21 generated by the combining unit 280 is displayed on the display unit 120 under the control of at least one of the main processor 210 and the graphics processor 220a.

The operations of the second image processing unit 250, the selective writing unit 260, the data reading unit 270, and the combining unit 280 may be simultaneously and/or sequentially performed according to embodiments. For example, the operation of the second image processing unit 250 and the operations of the selective writing unit 260 and the data reading unit 270 may be simultaneously performed, and the operation of the combining unit 280 may be performed whenever image data (i.e., the third image 11a and the fourth image 12a) according to results of the operations of the second image processing unit 250, the selective writing unit 260, and the data reading unit 270 are transmitted. The operations of the second image processing unit 250, the selective writing unit 260, the data reading unit 270, and the combining unit 280 may be performed in real time.

As described above, since the graphics processor 220a omits unnecessary writing and/or reading operations, the generation of the composite image 21 using a plurality of images, i.e., the first to fourth images 11, 11a, 12, and 12a, may be accelerated and thus it is possible to reduce the resources of the image processing apparatus 100 and to improve the operation speed of the image processing apparatus 100.

Hereinafter, various embodiments of a method of controlling an image processing apparatus will be described with reference to FIGS. 16 to 18.

Figure 16:
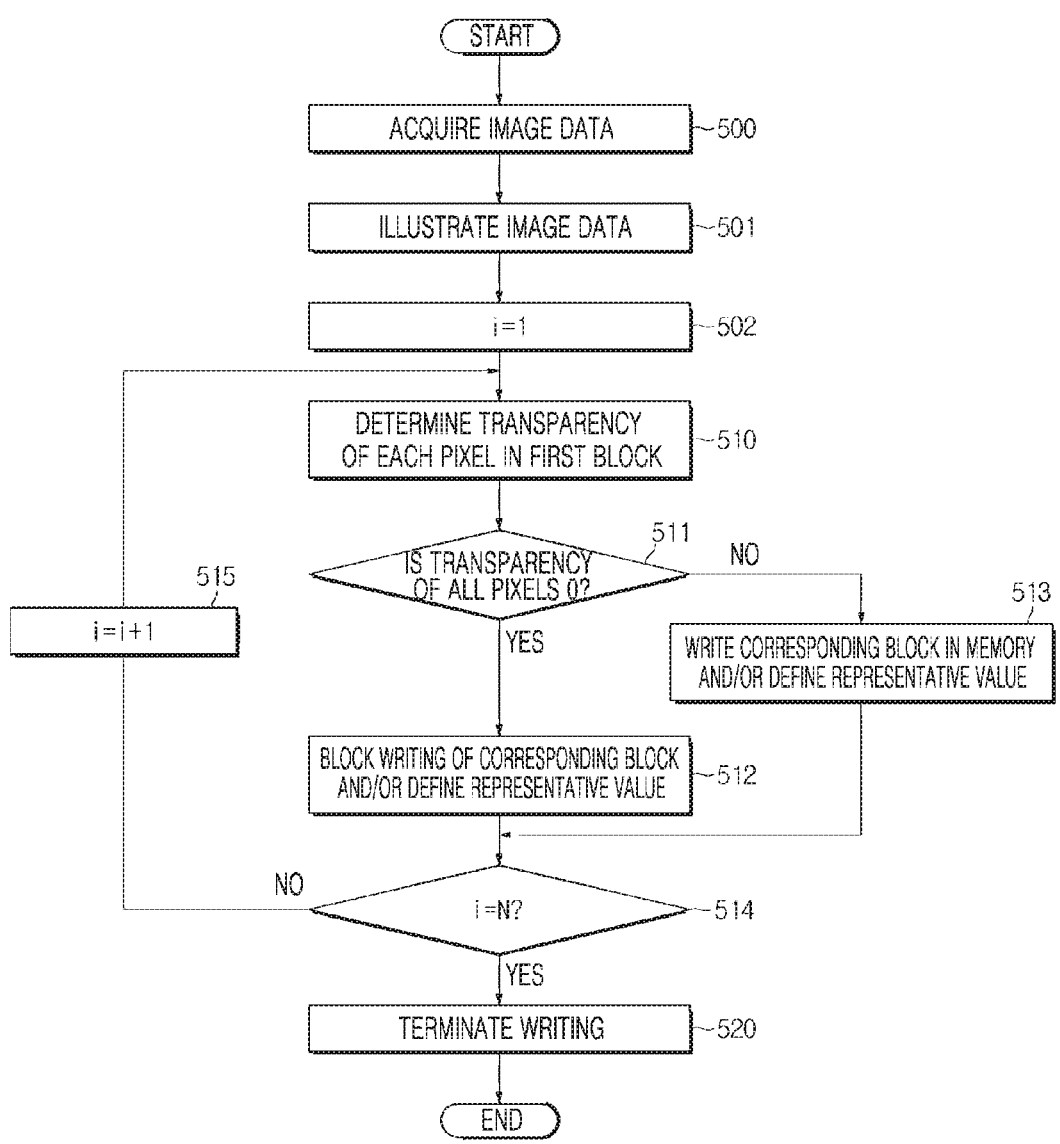
FIG. 16 is a first flowchart illustrating a method of controlling an image processing apparatus, according to an example embodiment.

FIG. 16 is a first flowchart illustrating a method of controlling an image processing apparatus, according to an example embodiment. FIG. 16 is a flowchart showing an example embodiment of a process in which an operation of writing image data to a memory is performed and/or an operation of writing image data to a memory is blocked.

Referring to FIG. 16, when the image processing apparatus is driven, a processor may acquire data for at least one image according to a user operation or a predefined setting (Operation 500). The processor may include at least one of a main processor and a graphics processor.

The processor may illustrate the data for the at least one image (Operation 501), and may determine a first block from among N blocks (where N is a natural number greater than 1) including some or all of the pixels forming the at least one image and determine whether or not each pixel in the first block satisfies a predefined condition. For example, the transparency of each pixel in the first block may be determined (Operation 510).

If it is determined that all the pixels in the first block satisfy the predefined condition (for example, if it is determined that the transparency of all the pixels is high) (YES of Operation 511), writing of image data of each pixel of the first block to a memory is blocked (Operation 512). In this case, the case that the transparency of all the pixels is high may include a case that an alpha value of each of the pixels is 0 or less than a predefined value. In addition, a representative value of the first block may be defined as a first representative value in addition to the blocking of image data writing. The first representative value may be inserted and written in a representative value table. The memory may include a frame buffer.

If it is determined that at least one of the pixels in the first block does not satisfy the predefined condition (for example, if it is determined that the transparency of the at least one pixel is low) (NO of Operation 511), image data of each pixel of the block is written and stored in the memory (Operation 513). In this case, the case that the transparency of the at least one pixel is low may include a case that an alpha value of the at least one pixel is not 0 or is greater than a predefined value. In addition, the representative value of the first block may be defined as a second representative value that is different from the first representative value. The second representative value may also be inserted and written in the representative value table in the same manner as the first representative value.

If it is determined that data writing or blocking of the data writing is not performed on all the blocks, for example, N blocks (NO of Operation 514), it is determined whether each pixel in a next block, for example, a second block, satisfies a predefined condition (Operations 515 and 510). Next, image data of each pixel of the second block is stored or is not stored in a memory in accordance with whether at least one pixel in the second block does not satisfy a predefined condition or whether all the pixels in the second block satisfy the predefined condition (Operations 511, 512, and 513). A representative value corresponding to the second block may also be defined (Operations 512 and 513).

The operation described above may be repeated until the operation is performed on all N blocks (Operation 514). When data writing and/or blocking of the data writing is performed on all the blocks, the operation described above may be terminated (Operation 520).

Figure 17:
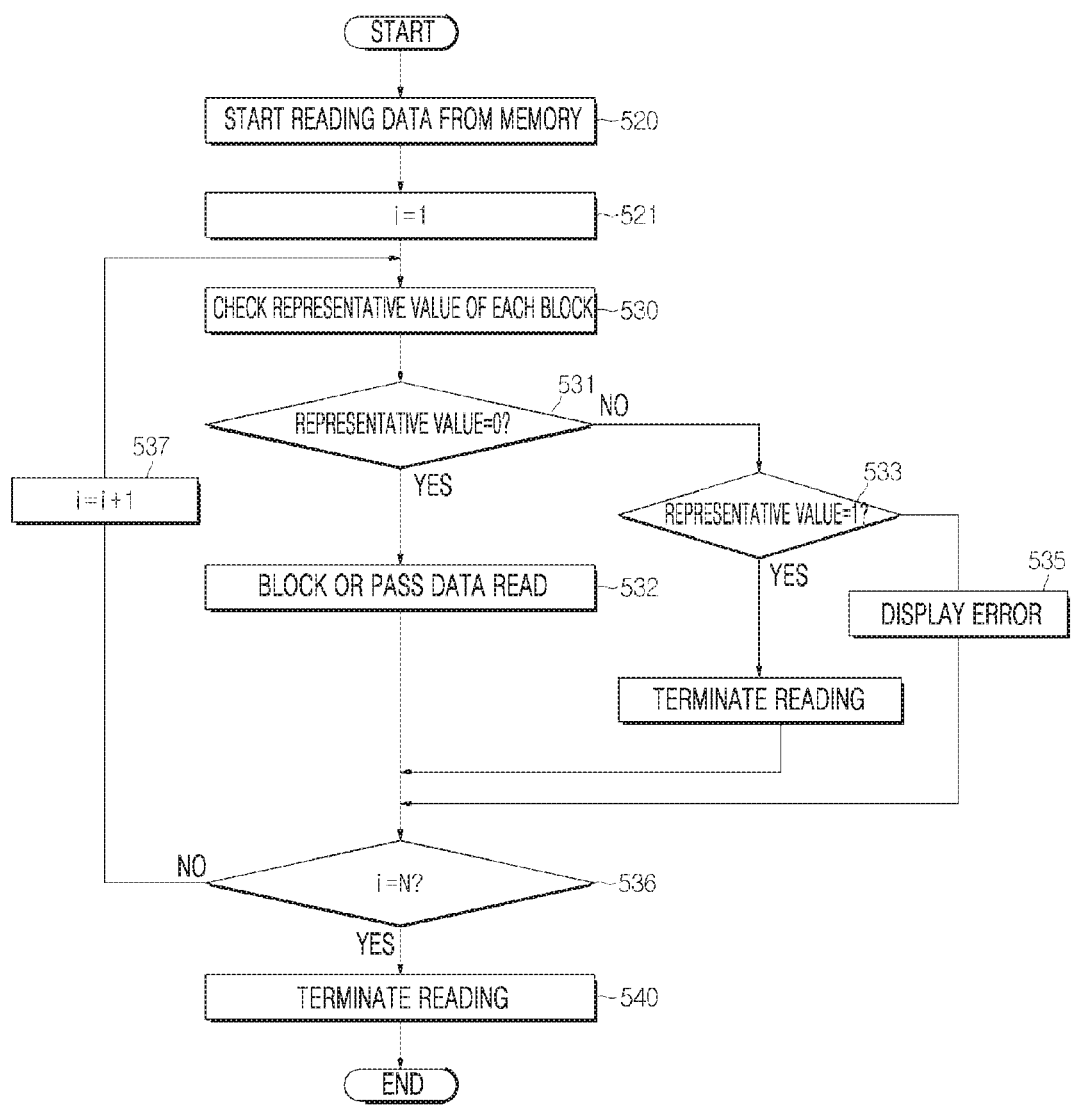
FIG. 17 is a second flowchart illustrating a method of controlling an image processing apparatus, according to an example embodiment.

FIG. 17 is a second flowchart illustrating a method of controlling an image processing apparatus, according to an example embodiment. FIG. 17 is a flowchart showing an example embodiment of a process in which an operation of reading image data written in a memory is performed and/or an operation of reading image data is blocked.

Referring to FIG. 17, image data is read from a memory by a processor, according to a user's command or predefined settings (Operation 520). The processor may include at least one of a main processor and a graphics processor as described above.

According to an example embodiment, the reading of the image data may be started after the processing for all the blocks (N blocks) is terminated (Operation 520 in FIG. 16), or may be started immediately after the processing for any one block, for example, a first block, is terminated (Operation 514 in FIG. 16). The reading of the image data may be started after the processing for a plurality of blocks, for example, a first block to a third block, is terminated.

When reading is started, a representative value for the first block is checked by the processor (Operations 521 and 530). The checking of the representative value for the first block may be performed through viewing of a representative value table.

If it is determined that the representative value is a first representative value, for example, 0 (YES of Operation 531), image data corresponding to the first block is not read (Operation 532). For example, the processor may pass a writing zone of the memory, which corresponds to the first block, without performing any special operation, or an image data reading operation on the writing zone, which is performed by the processor, may be blocked. Alternatively, the processor may not perform an access operation on the memory.

Conversely, if it is determined that the representative value is a second representative value, for example, 1 (NO of Operation 531 and YES of Operation 533), the processor may read image data corresponding to the first block from the memory (Operation 534).

According to an example embodiment, if it is determined that the representative value is neither the first representative value nor the second representative value (NO of Operation 533), the processor may determine it to be an error and display the error on a display unit or the like if necessary (Operation 535).

If it is determined that an image data read operation or blocking of the image data read operation is not performed on all the blocks, for example, N blocks (NO of Operation 536), a representative value in a next block, for example, a second block is checked (Operation 536), and image data corresponding to the second block is read or not read (Operations 531 to 534) according to the representative value.

The operation described above may be repeated until the operation is performed on all N blocks (Operation 536). When data reading and/or blocking of the data reading is performed on all the blocks, the operation described above is terminated (Operation 540). The display unit may display an image corresponding to read image data on a screen during the repetition of the operation described above and/or simultaneously with or after the end of the read operation.

Figure 18:
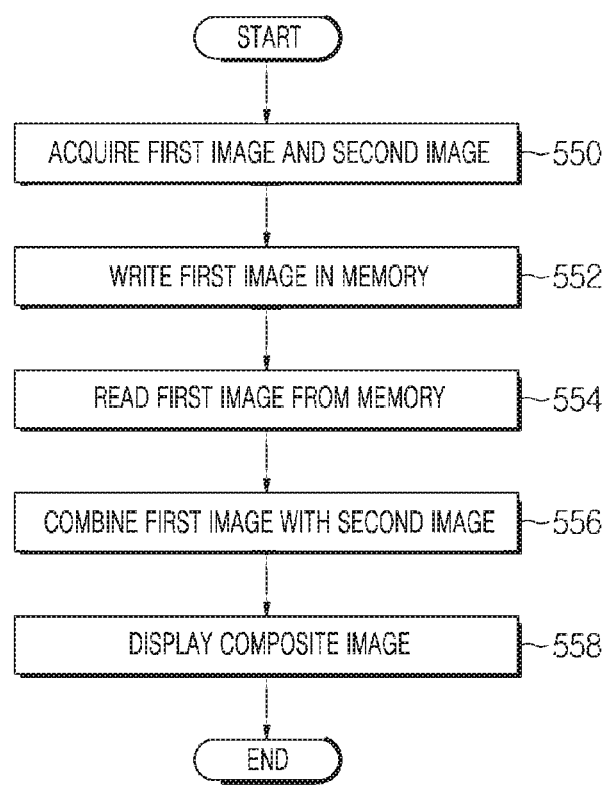
FIG. 18 is a flowchart illustrating a method of controlling an image processing apparatus, according to another example embodiment.

FIG. 18 is a flowchart illustrating a method of controlling an image processing apparatus, according to another embodiment.

Referring to FIG. 18, a processor may acquire a plurality of images, for example, a first image and a second image, from an input unit, a communication unit, and/or a storage unit (Operation 550). According to an example embodiment, the plurality of images may include three or more images.

When the plurality of images are acquired, as shown in FIG. 16, the processor determines whether pixels of each block set in a first image of the plurality of images satisfy a predefined condition. Based on a result of the determining, the processor writes and stores image data corresponding to at least one block in a memory or does not write image data corresponding to other blocks in the memory (Operation 552). In addition, a representative value of each block is determined.

Image data corresponding to the first image written in a memory may be read, as shown in FIG. 17, during the writing of the image data corresponding to the first image in the memory or after the end of the writing of the image data in the memory (Operation 554). The reading of the image data may be performed based on a representative value of each block. For example, image data of a certain block may be read and acquired according to the representative value of each block.

According to an example embodiment, the second image may be written to and read from the memory without the above-described processes (Operations 552 and 554). In addition, according to another embodiment, image data writing and/or blocking of the image data writing and image data reading and/or blocking of the image data reading as shown in FIGS. 16 and 17 may be performed on the second image in the same manner as the first image.

While a process of reading image data corresponding to at least one block from the memory and/or blocking of the reading process are performed or after the process is terminated, the first image and the second image may be combined with each other and thus a composite image may be acquired (Operation 556). In this case, the first image may be superimposed on the second image, or the second image may be superimposed on the first image. When either the first image or the second image has a transparent portion, a portion of other image, which corresponds to the transparent portion, is displayed on a screen.

The acquired composite image may be displayed externally by a display unit (Operation 558).

The method of controlling an image processing apparatus according to any of the above-described embodiments may be implemented in the form of a program that may be driven by various computer devices. The program may include program commands, data files, data structures, and the like, alone or in combination. The program may be designed and made using machine language code or high-level language code. The program may be specially designed to implement the method, or may be implemented using various functions or definitions that are well known and available to those skilled in the computer software field.

The program for implementing the method of controlling an image processing apparatus may be recorded on a recording medium readable by a computer. The recording medium readable by a computer may include various types of hardware devices capable of storing a certain program executed upon a call of a computer, for example, a magnetic disk storage medium such as a hard disk or a floppy disk, an optical medium such as a magnetic tape, a compact disk (CD), or a digital versatile disk (DVD), a magneto-optical medium such as a floptical disk, and a semiconductor storage device such as ROM, RAM or a flash memory.

While the inventive concept has been particularly shown and described with reference to embodiments thereof, it will be understood that various changes in form and details may be made therein without departing from the spirit and scope of the following claims.

What is claimed is:

1. An image processing apparatus comprising:
a memory configured to store a representative value table including representative values corresponding to a plurality of blocks, wherein each of the plurality of blocks includes a plurality of pixels, the representative values being binary values that indicate whether corresponding ones of the plurality of blocks satisfy a condition; and
a processor configured to,
determine whether pixels of at least one block of the plurality of blocks in a first image frame satisfy the condition by reading ones of the representative values corresponding to the at least one block from the representative value table, and
selectively store image data of the pixels of the at least one block in the first image frame in an area of the memory corresponding to the at least one block in response to the processor determining that at least one of the pixels of the at least one block satisfy the condition such that the processor is configured not to store the image data of each of the pixels of the at least one block in the area of the memory in response to all the pixels of the at least one block satisfying the condition.

2. The image processing apparatus of claim 1, wherein the condition includes at least one of whether the pixels are transparent, whether a transparency of each of the pixels is less than a reference value, and whether the image data of each of the pixels corresponds to a certain value.

3. The image processing apparatus of claim 1, the first image frame includes at least one of the at least one block and at least one line.

4. The image processing apparatus of claim 3, wherein the processor is configured to acquire the at least one block by dividing the first image frame at least once such that the at least one block at most partially overlaps another block.

5. The image processing apparatus of claim 1, wherein the processor is configured to,
define a representative value of the at least one block as a first representative value in response to all the pixels in the at least one block satisfying the condition, and
define the representative value of the at least one block as a second representative value in response to at least one of the pixels of the at least one block not satisfying the condition, the second representative value being different from the first representative value.

6. The image processing apparatus of claim 5, wherein the processor is configured to selectively read the image data from the memory such that the processor does not read the image data from the area of the memory, which corresponds to the at least one block, in response to the representative value of the at least one block being the first representative value.

7. The image processing apparatus of claim 5, wherein the processor is configured to selectively read the image data from the memory such that the processor reads the image data from the area of the memory, which corresponds to the at least one block, in response to the representative value of the at least one block being the second representative value.

8. The image processing apparatus of claim 7, further comprising:
a display device electrically connected to the memory.

9. The image processing apparatus of claim 8, wherein the display device is configured to display the image data read from the area of the memory and whose representative value is the second representative value.

10. The image processing apparatus of claim 8, wherein the processor is configured to acquire a composite image by combining a second image frame with the image data read from the area of the memory whose representative value is the second representative value, and the display device is configured to display the composite image.

11. A method of controlling an image processing apparatus, the method comprising:
storing, in a memory, a representative value table including representative values corresponding to a plurality of blocks, wherein each of the plurality of blocks includes a plurality of pixels, the representative values being binary values that indicate whether corresponding ones of the plurality of blocks satisfy a condition;
determining, by a processor, whether pixels of at least one block of the plurality of blocks in a first image frame satisfy the condition by reading ones of the representative values corresponding to the at least one block from the representative value table; and
selectively storing, by the processor, image data of the pixels of the at least one block in the first image frame in an area of the memory corresponding to the at least one block in response to the processor determining that at least one of the pixels of the at least one block satisfy the condition such that the selectively storing does not store the image data corresponding to each of the pixels of the at least one block in the area of the memory in response to all the pixels of the at least one block satisfying the condition.

12. The method of claim 11, wherein the condition includes at least one of whether the pixels are transparent, whether a transparency of each of the pixels is less than a reference value, and whether the image data of each of the pixels corresponds to a certain value.

13. The method of claim 11, wherein the first image frame includes at least one of the at least one block and at least one line.

14. The method of claim 13, further comprising:
acquiring the at least one block by dividing the first image frame at least once such that the at least one block at most partially overlaps another block.

15. The method of claim 11, wherein a shape of the at least one block is one of a circle, a rhombus, a triangle, a square, a rectangle, a trapezoid, and a polygon.

16. The method of claim 11, further comprising:
defining a representative value of the at least one block as a first representative value in response to all the pixels in the at least one block satisfying the condition; and
defining the representative value of the at least one block as a second representative value in response to at least one of the pixels of the at least one block not satisfying the condition, the second representative value being different from the first representative value.

17. The method of claim 16, further comprising:
selectively reading the image data from the memory such that the reading does not read the image data from the area of the memory, which corresponds to the at least one block, in response to the representative value of the at least one block being the first representative value.

18. The method of claim 16, further comprising:
selectively reading the image data from the memory such that the reading reads the image data from the area of the memory, which corresponds to the at least one block, in response to the representative value of the at least one block being the second representative value.

* * * * *